US005695315A

United States Patent [19]

Doi

[11] Patent Number: 5,695,315

[45] Date of Patent: Dec. 9, 1997

[54] APPARATUS FOR ACCURATELY POSITIONING A PRINTING PLATE STAND

[75] Inventor: Yoshiyuki Doi, Kanagawa, Japan

[73] Assignee: Fuji Photo Film Co., Ltd., Kanagawa, Japan

[21] Appl. No.: 281,148

[22] Filed: Jul. 27, 1994

Related U.S. Application Data

[63] Continuation of Ser. No. 846,801, Mar. 5, 1992, abandoned.

[30] Foreign Application Priority Data

| | | | |
|---|---|---|---|
| Mar. 8, 1991 | [JP] | Japan | 3-043834 |
| Mar. 15, 1991 | [JP] | Japan | 3-051522 |

[51] Int. Cl.$^{6}$ .............................. B65D 19/00; B62B 3/00

[52] U.S. Cl. ........................ 414/798.9; 414/401; 414/396

[58] Field of Search .................................... 414/401, 396, 414/584, 11, 590, 495, 798.1, 798.9, 737; 280/47.35, 840; 188/32; 410/30; 187/8.71; 254/10 B, 45, 49, 50; 269/309; 211/41

[56] References Cited

U.S. PATENT DOCUMENTS

| | | | |
|---|---|---|---|
| 3,216,531 | 11/1965 | Hutchinson | 280/47.35 |
| 3,690,477 | 9/1972 | Nilsson | 414/798.1 |
| 3,701,396 | 10/1972 | House | 188/32 |
| 3,765,550 | 10/1973 | Tausheck | 414/737 |
| 4,016,989 | 4/1977 | Furnari | 414/401 |
| 4,226,568 | 10/1980 | Christian | 414/589 |
| 4,538,956 | 9/1985 | Shioni et al. | 414/396 |
| 4,610,595 | 9/1986 | Hackersmith et al. | 414/589 |
| 4,746,258 | 5/1988 | Loomer et al. | 414/401 |
| 4,773,811 | 9/1988 | Wasner | 414/396 |
| 4,818,171 | 4/1989 | Buckholder | 414/401 |
| 4,861,220 | 8/1989 | Smith | 414/401 |
| 4,940,378 | 7/1990 | Feldmann et al. | 414/396 |
| 4,950,119 | 8/1990 | Nord et al. | 414/401 |
| 5,040,765 | 8/1991 | Schonfelder | 188/32 |
| 5,246,121 | 9/1993 | Mitake et al. | 211/41 |

FOREIGN PATENT DOCUMENTS

| | | | |
|---|---|---|---|
| 2633597 | 1/1990 | France | 414/737 |
| 2242934 | 3/1974 | Germany | 414/798.9 |
| 35077 | 3/1977 | Japan | 188/32 |
| 175329 | 8/1987 | Japan | 414/584 |
| 162649 | 6/1989 | Japan | 414/798.9 |
| 2293743 | 12/1990 | Japan . | |
| 2293744 | 12/1990 | Japan . | |
| 4-7213 | 1/1992 | Japan | 414/737 |

*Primary Examiner*—Karen B. Merritt
*Assistant Examiner*—R. B. Johnson
*Attorney, Agent, or Firm*—Sughrue,Mion,Zinn,Macpeak & Seas, PLLC

[57] ABSTRACT

A printing plate stand and an apparatus for positioning the printing plate stand are provided. The printing plate stand is movable and supplies printing plates to a printing plate transfer apparatus. The positioning apparatus includes, at a bottom surface of the printing plate stand, a pair of fixed wheels, movable only forward and backward, free wheels, movable in multi-directions, and leg portions which are located at vicinities of the free wheels and which can project downward further than the free wheels. The positioning apparatus has a raising and lowering device for moving the printing plate stand in vertical directions, blocks and ball casters which use the raising and lowering device and position the printing plate stand at a predetermined position when a first printing plate loading portion is opposed to and adjacent to the transfer apparatus, and blocks and ball casters which use the raising and lowering device and position the printing plate stand at the predetermined position when the printing plate stand is reversed and a second printing plate loading portion is opposed to and set adjacent to the transfer apparatus. Therefore a plurality of printing plates can be efficiently loaded, printing plate stand handling can be improved, and printing plate stand positioning with respect to the transfer apparatus becomes easy.

6 Claims, 22 Drawing Sheets

APPARATUS FOR ACCURATELY POSITIONING A PRINTING PLATE STAND

This is a continuation of application No. 07/846,801 filed Mar. 5, 1992, now abandoned.

BACKGROUND OF THE INVENTION

1. Field of the Invention

The present invention relates to a method of positioning a printing plate stand on which printing plates are loaded to be supplied to a printing plate printing apparatus, an apparatus for positioning the printing plate stand, and the printing plate stand itself.

2. Description of the Related Art

A printing plate used in a newspaper rotary press is made by applying a photosensitive material to a base material such as aluminum. After an image is exposed on the printing plate at a printing apparatus, the printing plate is supplied to a rotary press.

In general, a plurality of the printing plates is stacked, is loaded on a printing plate stand (hereafter occasionally referred to as a skid) either horizontally or at an angle, and is packed soundly. The printing plates are transported, along with the skid, from the printing plate manufacturer to the newspaper company. The skid is disposed at the loading portion of a printing apparatus. Starting with the topmost, the printing plates are supplied sequentially to the printing apparatus.

The printing plates are stored in this state of being loaded on the skid. Further, the skid is provided with wheels whose directions can be changed freely. The skid can be freely moved by these wheels.

When the printing plates are to be loaded to the printing apparatus, a worker moves this type of printing plate stand from the storage area by pushing the skid manually. Then, the printing plate stand, which is disposed at the loading portion of the printing apparatus, is accurately positioned by a positioning mechanism so that the printing plates can be supplied to the printing apparatus.

However, when a large number of printing plates are needed, large spaces are required for the transport of the printing plates by the printing plate stand and for their storage. Further, the directions of movement of the wheels of the printing plate stand can be freely changed so that the printing plate stand can be freely moved to an area where the printing apparatus or the like are located. Since the wheels are moved freely, the ability of the printing plate stand to move straight forward is sacrificed. It is hard to handle the printing plate stand while moving it. Moreover, the printing plate stands are loaded on a loading space of a truck or the like when transported from the printing plate manufacturer to the newspaper company. While being transported, the printing plate stands move around on the wheels mounted thereto. Such movement may result in the damaging or breaking of the printing plate stands or the printing plates.

Among the printing plates used for newspapers, the following two types are often used: printing plates that are the size of four newspaper pages (width=approximately two times the length of a newspaper, length=approximately two times the width of a newspaper), and printing plates that are the size of two newspaper pages (width=approximately two limes the length of a newspaper, length=approximately the same as the width of a newspaper). Accordingly, when these printing plates are inclined and loaded, it is desirable to ready two different types of stands: one whose height is equal to the length of four pages of newspaper, and one whose height is equal to the length of two pages of newspaper.

However, a printing plate stand on which small printing plates are effectively set is of necessity made short as a whole. It is thereby impossible for large printing plates to be set on such a printing plate. It may become necessary to supply a relatively small number of printing plates that are the size of four newspaper pages while a printing plate stand for printing plates that are the size of two newspaper pages is opposed to a printing plate transfer apparatus and printing plates are being supplied thereto. In such a case, the printing plate stand has to be replaced, and work becomes troublesome.

SUMMARY

The present invention relates to a method of positioning a printing plate stand. The printing plate stand is movable, and a plurality of printing plates are loaded thereat at both a first printing plate loading portion and a second printing plate loading portion, which are inclined surfaces provided back to back. The printing plate stand can supply the printing plates to a printing plate transfer apparatus. This method includes moving the printing plate stand such that the first printing plate loading portion of the printing plate stand is opposed to and is adjacent to the printing plate transfer apparatus. The printing plate stand is moved in vertical directions and in directions of approaching and moving away from the printing plate transfer apparatus and directions orthogonal to the directions of approaching and moving away from the printing plate transfer apparatus, so that the printing plate stand is positioned at a predetermined position. The method also includes reversing the printing plate stand such that the second printing plate loading portion of the printing plate stand is opposed to and is adjacent to the printing plate transfer apparatus. The printing plate stand is moved in the vertical directions and in the directions of approaching and moving away from the printing plate transfer apparatus and the directions orthogonal to the directions of approaching and moving away from the printing plate transfer apparatus, so that the printing plate stand is positioned at the predetermined position.

At an apparatus for positioning a printing plate stand of the present invention, the printing plate stand is movable, and a plurality of printing plates is held thereat at both a first printing plate loading portion and a second printing plate loading portion, which are inclined surfaces provided back to back. The printing plate stand can supply the printing plates to a printing plate transfer apparatus. The apparatus for positioning the printing plate stand includes a raising and lowering device for moving the printing plate stand in vertical directions. The apparatus for positioning the printing plate stand also includes a first positioning device for positioning the printing plate stand at a predetermined position. The first positioning device is provided so as to be located between the raising and lowering device and the printing plate stand when the printing plate stand is moved such that the first printing plate loading portion of the printing plate stand is opposed to and is adjacent to the printing plate transfer apparatus. The first positioning device moves the printing plate stand in directions of approaching and moving away from the printing plate transfer apparatus and in directions orthogonal to the directions of approaching and moving away from the printing plate transfer apparatus, so as to position the printing plate .stand at a predetermined position. The apparatus for positioning the printing plate stand also includes a second positioning device for positioning the printing plate at the predetermined position. The second positioning device is provided between the raising and lowering device and the printing plate stand when the printing plate stand is reversed such that the second printing plate loading portion of the printing plate stand is opposed to and is adjacent to the transfer apparatus. The second positioning device moves the printing plate stand in the directions of approaching and moving away from the printing plate transfer apparatus and in the directions orthogonal to the directions of approaching and moving away from the printing plate transfer apparatus, so as to position the printing plate stand at the predetermined position.

At the apparatus for positioning a printing plate stand, the first positioning device has first positioning members having inclined surfaces and provided on either the lower portion of a main body of the printing plate stand or the raising and lowering device. The second positioning device has second positioning members which are provided on the other of the lower portion of the main body of the printing plate stand or the raising and lowering device and which abut against the inclined surfaces of said first positioning members so as to slide the printing plate stand. The second positioning device also includes a third positioning member which stops the slid printing plate stand at the predetermined position so as to position the printing plate stand at the predetermined position.

At the apparatus for positioning a printing plate stand of the present invention, the first positioning members are block-shaped members. The inclined surfaces are triangular grooves formed in the block-shaped members. The second positioning members are ball casters which abut on the triangular grooves. The third positioning member is a convex member which stops the slid printing plate stand by abutting on the printing plate stand.

A printing plate stand of the present invention is movable, and a plurality of printing plates is held thereat at both a first printing plate loading portion and a second printing plate loading portion, which are inclined surfaces provided back to back. The printing plate stand can supply the printing plates to a printing plate transfer apparatus. The printing plate stand includes a first positioning device for positioning the printing plate stand. The first positioning device is provided at a lower portion of a main body of the printing plate stand. The first positioning device positions the printing plate stand, when the printing plate stand is moved and the first printing plate loading portion is opposed to and is adjacent to the transfer apparatus, at a predetermined position in directions in which the printing plate stand and the printing plate transfer apparatus approach and move away from each other and in directions orthogonal to the directions in which the printing plate stand and the printing plate transfer apparatus approach and move away from each other. The printing plate stand also includes a second positioning device for positioning the printing plate stand. The second positioning device is provided at the lower portion of the main body of the printing plate stand. The second positioning device positions the printing plate stand at the predetermined position in directions in which the printing plate stand and the printing plate transfer apparatus approach and move away from each other and in directions orthogonal to the directions in which the printing plate stand and the printing plate transfer apparatus approach and move away from each other, when the printing plate stand is reversed and the second printing plate loading portion is opposed to and is adjacent to the transfer apparatus.

At the printing plate stand of the present invention, the first positioning device has at least two block members with triangular grooves or has at least two ball casters.

The printing plate stand is movable by groups of wheels. The groups of wheels include fixed wheels, which are provided at both end portions in a longitudinal direction of a bottom surface of a main body of the printing plate stand at a central portion in a transverse direction, and whose direction of movement is restricted to one direction. The groups of wheels also include free wheels, which are provided at both sides in the transverse direction of the direction of movement of the fixed wheels, and whose direction of movement is free.

The printing plate stand of the present invention is provided with a plurality of leg portions. The leg portions are disposed so as to be able to protrude further downward of the groups of wheels and support the printing plate stand when the leg portions are protruded.

The present invention also relates to a method of loading a plurality of printing plates on a printing plate stand. The printing plate stand is movable, and the plurality of printing plates are loaded thereat at both a first printing plate loading portion and a second printing plate loading portion, which are inclined surfaces provided back to back. The printing plate stand can supply the printing plates to a printing plate transfer apparatus. The method of loading the plurality of printing plates on the printing plate stand includes a step of moving the plurality of printing plates toward one end portion in a transverse direction of the first printing plate loading portion so as to load the plurality of printing plates on the first printing plate loading portion. Another step of this method involves loading the plurality of the printing plates at a position at the second printing plate loading portion, such that the position is symmetrical, about a central point of the printing plate stand, to a position of the first printing plate loading portion at which the plurality of printing plates is moved and loaded.

A printing plate stand of the present invention is movable on a floor. At the printing plate stand, a plurality of first printing plates are stacked and loaded on at least one of a pair of printing plate loading portions, which are inclined surfaces provided back to back. One of the printing plate loading portions on which the plurality of first printing plates is loaded is opposed to a printing plate transfer apparatus such that the printing plate stand is able to supply the first printing plates to the printing plate transfer apparatus. The printing plate stand has a printing plate supporting member which is disposed so as to be able to protrude at an upper portion of a main body of the printing plate stand. The printing plate supporting member, when protruded, supports vicinities of upper portions of second printing plates, which are larger than the first printing plates, when the second printing plates are loaded on at least one of the printing plate loading portions. The printing plate stand also includes a supporting member maintaining device for maintaining the supporting member at a state in which the supporting member protrudes at the upper portion of the main body of the printing plate stand, and at a state in which the supporting member is accommodated.

A printing plate stand of the present invention is movable on a floor. At the printing plate stand, a plurality of first printing plates is stacked and loaded on at least one of a pair of printing plate loading portions, which are inclined surfaces provided back to back. One of the printing plate loading portions on which the plurality of first printing plates is loaded is opposed to a printing plate transfer apparatus such that the printing plate stand is able to supply the first printing plates to the printing plate transfer apparatus. The printing plate stand has a supporting member attaching portion at which the printing plate supporting member is attached to the printing plate stand. When second printing plates, which are larger than the first printing plates, are loaded on at least one of the printing plate loading portions, the printing plate supporting member supports vicinities of upper portions of the second printing plates. The supporting member can be removed from the upper portion of the main body of the printing plate stand.

At the printing plate stand of the present invention, the supporting member attaching portion is provided at at least one of both ends on the printing plate loading stand in directions in which the printing plate stand and the transfer apparatus approach and move away from each other and in directions orthogonal to the directions in which the printing plate stand and the transfer apparatus approach and move away from each other. The printing plate supporting member is a handle which is grasped and used when the printing plate stand is being moved.

A printing plate stand of the present invention is movable on a floor. At the printing plate stand, a plurality of first printing plates is stacked and loaded on at least one of a pair of printing plate loading portions, which are inclined surfaces provided back to back. One of the printing plate loading portions on which the plurality of first printing plates is loaded is opposed to a printing plate transfer apparatus such that the printing plate stand is able to supply the first printing plates to the printing plate transfer apparatus. The printing plate stand includes a printing plate supporting member which supports vicinities of upper portions of second printing plates when the second printing plates are loaded on at least one of the pair of printing plate loading portions. The second printing plates are higher than the first printing plates. Upper ends of the second printing plates protrude upwardly of the printing plate loading portion. The printing plate supporting member is disposed so as to protrude toward a side of the printing plate loading portion further than an extended line along an inclined surface of the printing plate loading portion at which the second printing plates are loaded.

Operation of the present invention with the above structure will now be described.

In the method of positioning the printing plate stand, the printing plate stand is moved upward and is moved in directions of approaching and moving away from the transfer apparatus and in directions orthogonal to the directions of approaching and moving away from the transfer apparatus. The printing plate stand is thereby positioned at a predetermined position. This method of positioning can be effected in the same way for both the first and second printing plate loading portions, which are both inclined surfaces.

By moving the printing plate stand to the predetermined position, the printing plates loaded on either the first or the second printing plate loading portion of the printing plate stand can be supplied to the printing plate transfer apparatus.

An external force may be applied to the printing plate stand to move the printing plate stand in the vertical directions and in the directions of approaching and moving away from the transfer apparatus and in the directions orthogonal to the directions of approaching and moving away from the transfer apparatus, to the predetermined position. Gravitational force or other forces may also be applied to the printing plate stand to move the printing plate stand in the directions of approaching and moving away from the transfer apparatus and the directions orthogonal to the directions of approaching and moving away. As the external force, it is preferable to use a driving force from a motor or the like, or a driving force from gas or liquid pressure. However, manual force can also be used.

At the apparatus for positioning the printing plate stand, either the first or the second printing plate loading portion is disposed so as to oppose the printing plate transfer apparatus. The printing plate stand is moved in the vertical directions by the raising and lowering device. Further, positioning of the printing plate stand at the predetermined position in the directions of approaching and moving away from the transfer apparatus and in the directions orthogonal to the directions of approaching and moving away, may be effected by the printing plate stand being moved by either the first or the second positioning device. The first and second positioning devices are provided so as to be located between the printing plate stand and the raising and lowering device.

The first and second positioning devices are provided corresponding to both the first and second printing plate loading portions of the printing plate stand. Either the first or the second printing plate loading portion is opposed to the printing plate transfer apparatus, and the printing plate stand is moved to the predetermined position such that positioning can be effected.

In the apparatus for positioning the printing plate stand of the present invention, the positioning device is constituted by either the raising and lowering device or inclined surfaces formed at the printing plate stand.

The printing plate stand, which is elevated by the raising and lowering device, is supported by the raising and lowering device at the inclined surfaces. The printing plate stand moves by its own weight along the inclined surfaces. The printing plate stand is moved to the predetermined position by the movement of the printing plate stand along the inclined surfaces. Positioning of the printing plate stand can thereby be effected. Namely, the printing plate stand can be moved to the predetermined position without special application of an external force.

At the apparatus for positioning the printing plate stand, the inclined surfaces for the printing plate stand are formed in block members. Further, triangular grooves along the inclined surfaces are formed. Ball casters are disposed opposing the triangular grooves.

The printing plate stand, which is elevated by the raising and lowering device, is supported by the ball casters abutting on the triangular grooves, which are formed at the inclined surfaces of the block members, and abutting on the triangular grooves. Further, the ball casters move along the inclined surfaces with the direction of movement of the ball casters being controlled by the triangular grooves. The printing plate stand moves by the movement of the ball casters. Positioning in one direction is effected by the triangular grooves. Positioning can be effected by moving the printing plate stand to the predetermined position along the inclined surfaces.

Namely, positioning in the directions in which the printing plate stand and the printing plate transfer apparatus approach and move away from each other, or in the directions orthogonal to the directions in which the printing plate stand and the printing plate transfer apparatus approach and move away from each other, can be effected by the abutting of the ball casters on the triangular grooves formed in the block members.

At the printing plate stand of the present invention, the first and second positioning devices are provided corresponding to both the first and the second printing plate loading portions, which are inclined surfaces. When the surface of either of the first or the second printing plate loading portion is set opposed to and adjacent to the printing plate transfer apparatus, by the positioning devices, the printing plate stand can be moved to the predetermined position in the directions of approaching and moving away from the transfer apparatus and in the directions orthogonal to the directions of approaching and moving away, and can be positioned thereat.

At the printing plate stand, the first and second printing plate loading portions are inclined surfaces provided back to back. A plurality of printing plates can be loaded at one time on the printing plate stand. The printing plate stand can be positioned at the predetermined position in the directions in which the printing plate stand and the printing plate transfer apparatus approach and move away from each other and in directions orthogonal to the directions of approaching and moving away.

One of the ball casters and the block members, in which the triangular grooves serving as a positioning device are formed, is provided at the printing plate stand of the present invention, and is disposed facing the other of the ball casters and the block members.

Positioning in the directions in which the printing plate stand and the printing plate transfer apparatus approach and move away from each other or in the directions orthogonal to the directions of approaching and moving away can be effected by the abutting of the ball casters on the triangular grooves formed in the block members. Further, the printing plate stand can be moved, along the triangular grooves by the ball casters, in another direction to the predetermined position. Positioning can thereby be effected.

Namely, the positioning devices, which position the printing plate stand at a predetermined position with respect to the printing plate transfer apparatus, are interposed between the printing plate stand and the raising and lowering stand, and move the printing plate stand to the predetermined position. The printing plate stand is stopped at the predetermined position. The preceding functions can be performed by members provided at the printing plate stand, or by members provided at the positioning devices, or by members provided at both.

The provision of fixed wheels at substantially central portions of the printing plate stand allows the printing plate stand to be stably moved in a direction in which movement of the fixed wheels is possible. In addition, free wheels are provided at both ends in the direction of movement of the fixed wheels. When the direction of the printing plate stand is changed, the printing plate stand can be rotated on these free wheels, with the fixed wheels serving as the center of rotation.

The movement in a straight line of the printing plate stand, which moves by these groups of wheels, improves. The printing plate stand can be rotated with the fixed wheels, provided at the substantially central portions of the printing plate stand, as the center of rotation. As a result, the changing of direction and other movements of the printing plate stand become more manageable. Moving the printing plate stand is easier.

At the printing plate stand, a plurality of leg portions, which can be protruded further downward of the groups of wheels, are provided. When the leg portions are protruded, the wheels, which are provided for the moving of the printing plate stand, are suspended above the surface on which the printing plate stand is placed. Further, the printing plate stand can be reliably supported on the floor or on a shelf by these leg portions.

When the printing plate stand is being transported by a truck or the like, the printing plate stand is raised by a forklift or other means during loading and unloading. The leg portions can be set in either a protruded or an accommodated state while the printing plate stand is raised up by the forklift.

The number and arrangement of the plurality of leg portions is only limited in so far as the leg portions should stably support the printing plate stand. At the least, three leg portions can be provided; having four leg portions or more is preferable. It is even more preferable that the space between the leg portions be wide.

In the method of the present invention of loading the printing plates, the printing plates loaded on the first printing plate loading portion are lined up at one of the end surfaces, i.e., surfaces orthogonal to the first and the second printing plate loading portions. The printing plates loaded on the second printing plate loading portion are lined up and loaded at the other end surface, i.e., the printing plates are loaded at a portion of the second printing plate loading stand which is symmetrical about a central point of the printing plate stand to a point of the first printing plate loading portion at which the printing plates are loaded.

Namely, the printing plates which are loaded on the printing plate loading portions are loaded in the same way at one of the end surfaces.

When the printing plate stand is moved and is positioned at the predetermined position, positioning in one direction can be the reference for executing positioning. By moving the end surface, which is the reference for the loaded printing plates, to the predetermined position and effecting positioning, the printing plates, which are loaded on the printing plate stand with respect to the printing plate transfer apparatus, can be arranged in a predetermined state with respect to the printing plate transfer apparatus.

Further, even when printing plates of different sizes are used, by disposing the printing plates so as to correspond to the reference position, the printing plates can always be opposed to the printing plate transfer apparatus in a predetermined state.

The printing plate supporting member is attached, by the supporting member attaching means, to a top of the printing plate stand so as to be able to protrude therefrom. When second printing plates, which are larger than first printing plates, are loaded on a printing plate loading portion, the printing plate supporting member supports vicinities of upper portions of the second printing plates. Therefore, even if the loading portion is not as high as the second printing plates, the second printing plates can be stably supported.

The length of printing plates that are the size of two newspaper pages is substantially half of that of printing plates that are the size of four newspaper pages. For example, when printing plates that are the size of four newspaper pages are temporarily loaded, the printing plates that are the size of four newspaper pages are loaded on top of the printing plates that are the size of two newspaper pages. At this point, portions of the printing plates that are the size of four newspaper pages which are downward of the intermediate portions thereof, contact the topmost of the printing plates of sizes of two sheets of newspaper along the inclined surface. Portions of the printing plates that are the size of four newspaper pages which are upward of the intermediate portions thereof, are supported by the printing plate supporting member.

If the printing plate supporting member is foldable, the printing plate supporting member can normally be left in an accommodated state. If the printing plate supporting member is only protruded when used, the printing plate supporting member does not get in the way ordinarily or during storing. Printing plate supporting members may be provided so as to correspond respectively to each of the pair of printing plate loading portions, or a single printing plate supporting member may be used commonly for both of the pair of printing plate loading portions.

When the second printing plates are loaded on the printing plate loading portion of the printing plate stand of the present invention, the printing plate supporting member, which supports the vicinities of the upper portions of the second printing plates, is attachable. By attaching the printing plate supporting member, the second printing plates can be temporarily loaded to the printing plate loading stand on which the first plates are loaded. When not needed, the printing plate supporting member is removed from the printing plate stand. It is thereby easier to handle the printing plate stand.

In the present invention, a handle is used as the printing plate supporting member. By providing the printing plate supporting member attaching portion at at least one of end portions in the directions in which the printing plate stand approaches and moves away from the printing plate transfer apparatus and in the directions orthogonal to the directions of approaching and moving away, the handle can be used to move the printing plate stand.

For example, the height of a printing plate stand, on which printing plates that are the size of two newspaper pages are loaded, is low. However, the printing plate stand can be easily moved when the handle is attached. Further, when the handle is not being used, it can be removed so that it does not get in the way during-transport of or storage of the printing plate stand. The handle can be used for a large number of printing plate stands.

A plurality of holes can be provided as the printing plate supporting member attaching portion provided at the printing plate stand. By being inserted into the through-holes, the handle may be attached and fixed to the printing plate stand.

When the second printing plates are loaded on the printing plate loading portion, a printing plate supporting portion of the printing plate supporting member, which supports the second printing plates, is inclined toward an outer side of an extended line which extends along the slope of the printing plate loading portion, i.e., the printing plate supporting member is inclined further toward the printing plate loading portion side than inclination of the extended line. Accordingly, the second printing plates loaded on the printing plate loading portion are loaded stably without bending excessively.

By using the method of positioning a printing plate stand, the apparatus for positioning a printing plate stand, and the printing plate stand, a large number of printing plates can be effectively positioned with respect to the printing plate transfer apparatus. In addition, a plurality of printing plates can be loaded on the printing plate loading stand at the printing plate loading portions, which are provided back to back. Movement of the printing plate stand forward and backward improves, and keeping the printing plate stand stable during storage or transport also becomes easy. The manageablility of the printing plate stand is thereby improved.

In the above-described method of positioning the printing plate stand relating to the present invention, positioning can be effected by the printing plate stand being moved, in the vertical directions and in the directions in which the printing plate stand approaches and moves away from the printing plate transfer apparatus and in the directions orthogonal to the directions of approaching and moving away, to the predetermined position.

At the apparatus for positioning the printing plate stand of the present invention, the printing plate stand is elevated by the raising and lowering device. The positioning devices are provided between the printing plate stand and the raising and lowering device, and are located at either the printing plate stand or the raising and lowering device. The printing plate stand is moved by the triangular grooves formed in the block-shaped members and by the ball casters and the like, such that the printing plate stand can easily be positioned at the predetermined position.

At the printing plate stand of the present invention, both of the printing plate loading portions, which are inclined surfaces provided back to back, can easily be positioned with respect to the transfer apparatus by the first and second positioning devices, which correspond to both the first and the second printing plate loading portions.

In addition, the fixed wheels, which can move only in the forward direction, are disposed at central portions of the printing plate stand. The ability of the printing plate stand to move straight forward thereby improves. When the direction of the printing plate stand is to be changed, directions of the free wheels, which are located at both ends, change, and the printing plate stand can be rotated with a point midway between the pair of fixed wheels as the center of rotation. The direction of the printing plate stand can therefore be changed in a narrow space.

Further, the leg portions are provided at the printing plate stand. When the printing plate stand is supported by the leg portions, the wheels are suspended above the ground. In this state, the printing plate stand cannot be moved easily. Therefore, a superior effect results in that breakage during transport can be prevented. The present invention provides a printing plate stand in which a plurality of printing plates can be efficiently loaded and which can be handled with improved efficiency. The present invention also provides a method of positioning, in which the printing plate stand can be easily positioned with respect to the printing plate transfer apparatus, and an apparatus for positioning the printing plate stand.

At the printing plate stand relating to the present invention, the first printing plates are loaded and supplied to the printing plate transfer apparatus. The provision of the printing plate supporting member permits loading and supplying of second printing plates, which are larger than the first printing plates.

The printing plate supporting member can be accommodated by the printing plate supporting member attaching portion or can be removed therefrom.

In addition, the handle is provided at the printing plate stand such that even if the printing plate stand is not tall, it can be easily moved. Having the handle serve as the printing plate supporting member and vice-versa eliminates the need to provide projections on the printing plate stand.

When printing plates that are the size of four newspaper pages are temporarily supplied, the handle, which is used to move the printing plate stand, can stably support and hold the printing plates that are the size of four newspaper pages.

The present invention provides a printing plate stand on which a plurality of printing plates that are the size of two newspaper pages can be efficiently loaded, and whose handling and storage efficiency are improved.

DESCRIPTION OF THE PREFERRED EMBODIMENTS

Figure 1:
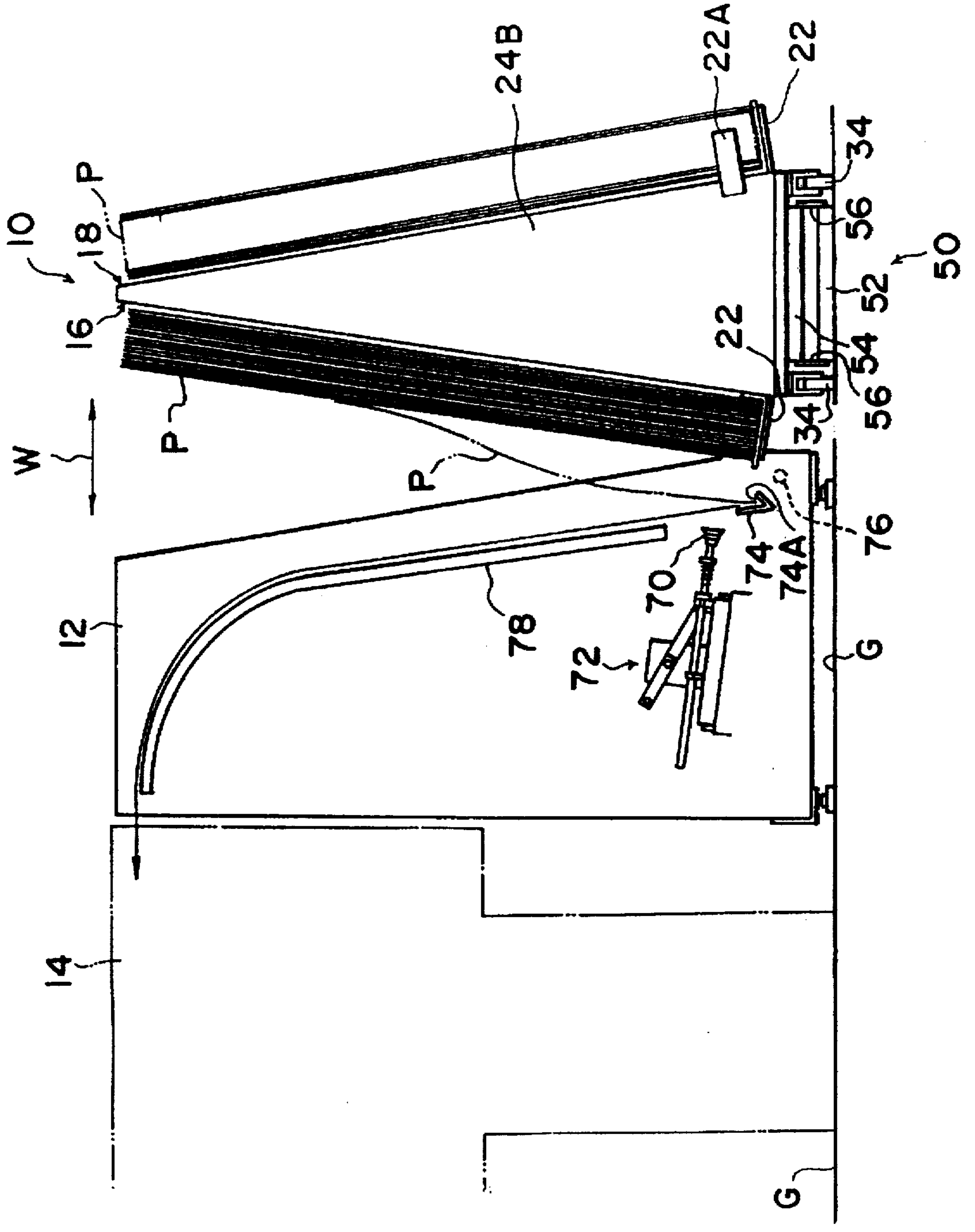
FIG. 1 is a side view illustrating an arrangement of a transfer apparatus and a printing plate stand of a first embodiment.
Figure 2:
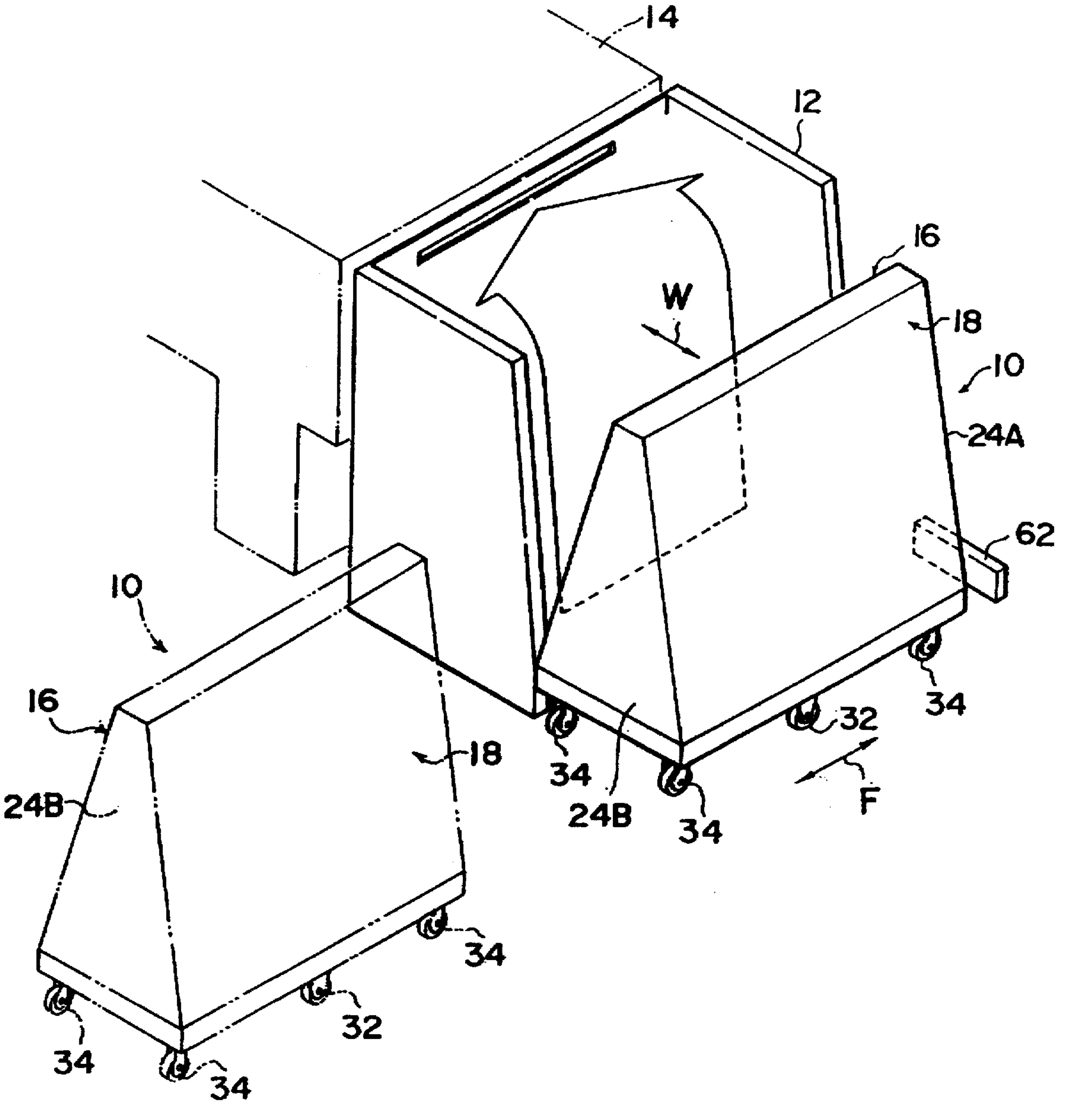
FIG. 2 is a perspective view illustrating the arrangement of the transfer apparatus and the printing plate stand of the first embodiment.

In FIG. 1 and FIG. 2, a printing plate stand 10 of the present embodiment is disposed opposing a transfer apparatus 12. In each figure, arrow W refers to directions in which the transfer apparatus 12 and the printing plate stand 10 approach and move away from each other, which are transverse directions. Arrow F designates a longitudinal direction of the printing plate stand 10.

Figure 3:
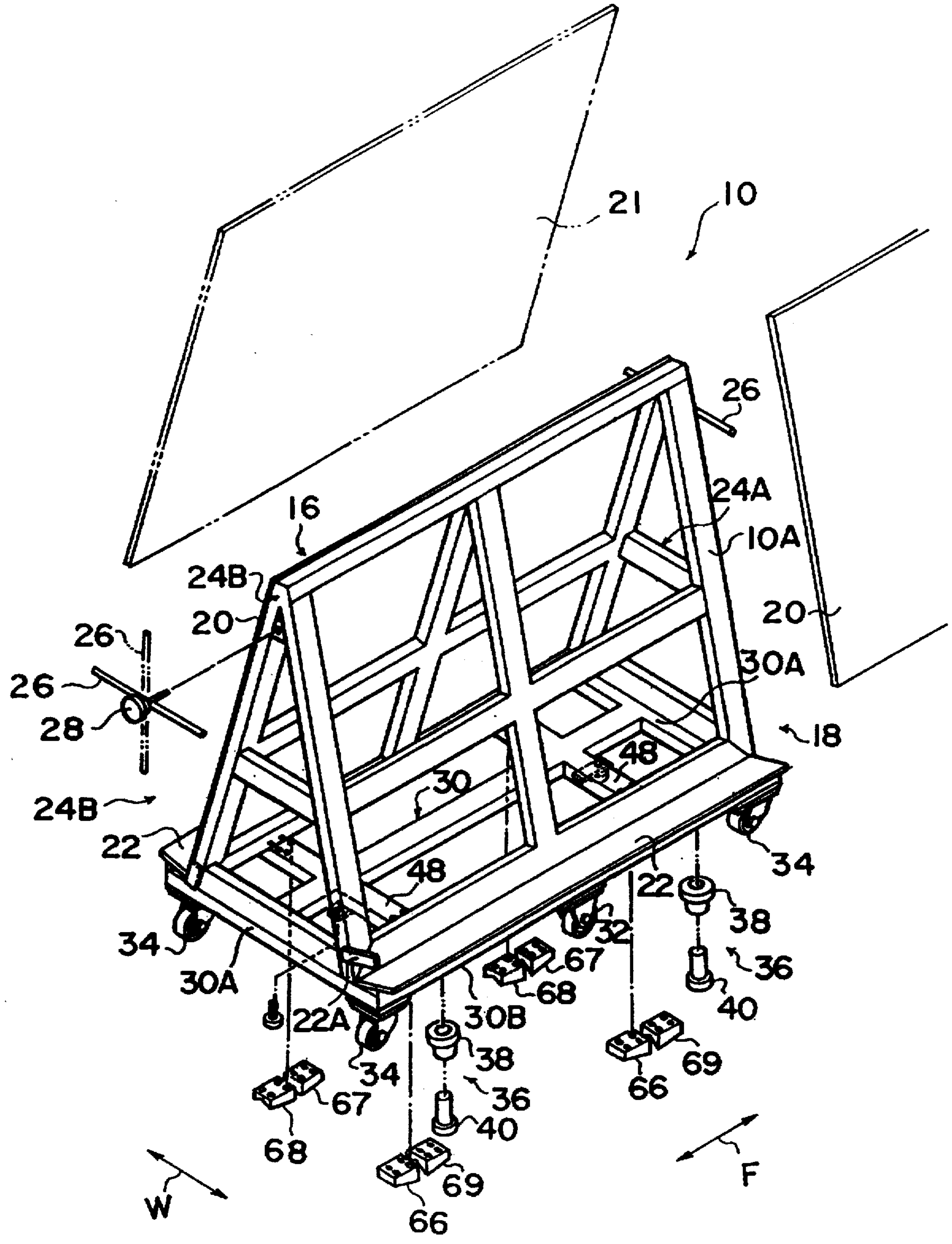
FIG. 3 is an exploded perspective view of the printing plate stand of the first embodiment.

In FIG. 3, the printing plate stand 10 is illustrated in detail. The printing plate stand 10 has a frame structure formed by a frame 10A at which front wall 16 and rear wall 18 are inclined. As seen from the longitudinal direction of the printing plate stand 10 (from the direction of arrow F in FIG. 3), the printing plate stand 10 has a substantially isosceles triangular configuration.

Support plates 20 are disposed at the inclined surfaces in the transverse direction, i.e., at the front wall 16 and the rear wall 18, so as to cover the frame 10A. The front wall 16 and the rear wall 18 are planar. Brackets 22, which project towards the outer sides in the transverse direction of the printing plate stand 10, are provided respectively at lower end portions of the front wall 16 and the rear wall 18 along the longitudinal direction.

As shown in FIG. 1, the brackets 22 can support ends of a plurality of printing plates P. Accordingly, a plurality of printing plates P can be stacked at both surfaces of the front wall 16 and the rear wall 18 of the printing plate stand 10. The front wall 16 and the rear wall 18 form a pair of printing plate loading portions.

Stoppers 22A, which are shaped as flat boards, are disposed respectively at both ends in the longitudinal direction of the printing plate stand 10, i.e., along end surfaces 24A, 24B. The stopper 22A provided at the end surface 24A protrudes towards the front wall 16. The stopper 22A provided at the end surface 22B protrudes toward the rear wall 18. The brackets 22 and the stoppers 22A abut on end portions of the printing plates P respectively at the front wall 16 and the rear wall 18 of the printing plate stand 10. The printing plates P are loaded in stacks on the support plates 20.

Further, the stoppers 22A may be extractable from the front wall 16 and the rear wall 18. The stoppers 22A may be extractable from arbitrary positions on the support plates 20, rather than being provided at the end surfaces 24A, 24B.

When the printing plate stand 10 of the first embodiment is transported with a plurality of printing plates P stacked and loaded at the front wall 16 and the rear wall 18, a wear plate 21, made of plastic or wood, is set on top of the topmost of the stacked printing plates P, and an unillustrated belt is wound around the printing plate stand 10 in either a horizontal or a vertical direction. When the printing plate stand 10 is made to approach the above-described printing plate transfer apparatus, the belt and the wear plates 21 are removed.

Both ends in the longitudinal direction of the printing plate stand 10, i.e., the end surfaces 24A and 24B, are open. At a top portion of each of these ends, a pole shaped handle bar 26 is disposed. An unillustrated through-hole is formed in an intermediate portion of the handle bar 26. A handle 28 inserted into the through-hole is screwed into and fixed at the frame 10A. This fixing of the handle 28 is made stable by the handle bar 26 being set in a horizontal state (as shown by the solid line in FIG. 3) or in a vertical state (as shown by the two-dot chain line in FIG. 3) in an unillustrated groove formed in the frame 10A. When a worker moves the printing plate stand 10, the handle bar 26 is set horizontally. The handle bar 26 is in an accommodated state when set vertically.

The lower frame 30 of the printing plate stand 10 has a rectangular configuration formed by the frames 30A, disposed at both ends in the longitudinal direction, and the frames 30B, disposed at both ends in the transverse direction. At intermediate portions of the frames 30B, a pair of fixed wheels 32 is disposed such that the movement of the fixed wheels 32 is fixed in the longitudinal direction of the printing plate stand 10. Further, at each end of the frames 30B, free wheels 34, whose direction of movement can be altered freely, are disposed. The fixed wheels 34 protrude slightly more than the free wheels 32 protrude. When the printing plate stand 10 is supported on a floor by the fixed wheels 32 and the free wheels 34, the fixed wheels 32 are always contact with the floor.

Figure 4:
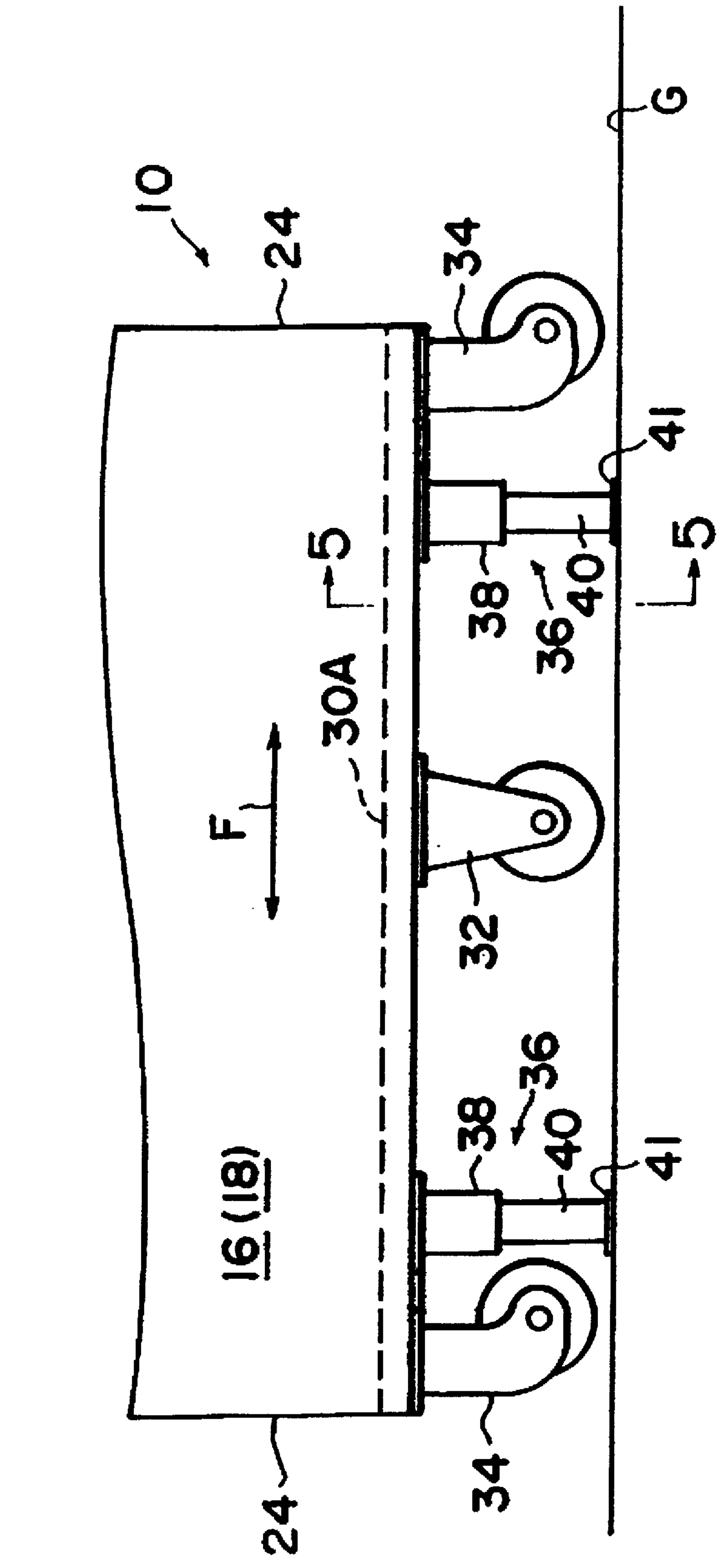
FIG. 4 is a front view of principal portions of the printing plate stand of the first embodiment.
Figure 5:
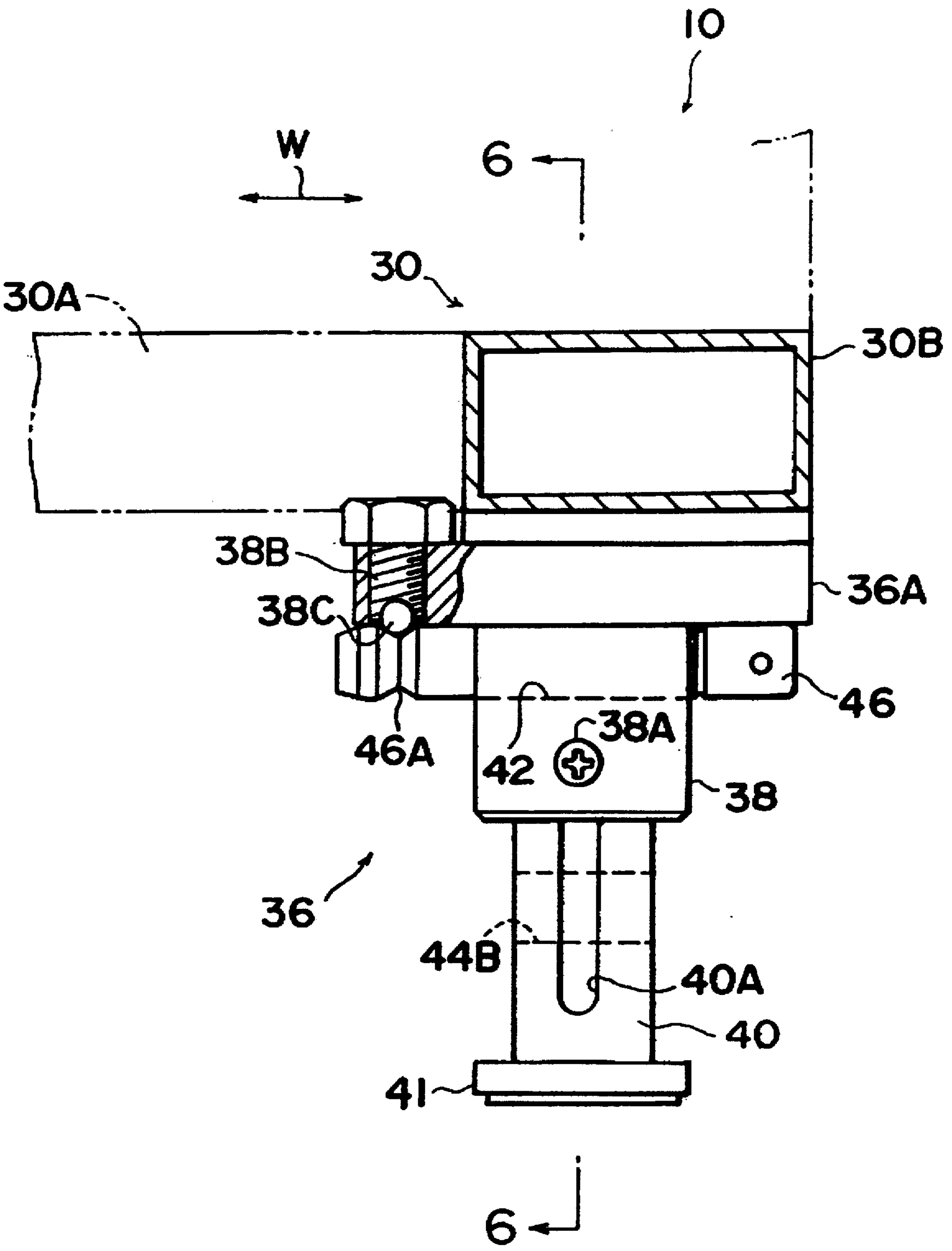
FIG. 5 is a side view of a leg portion of the first embodiment.
Figure 6:
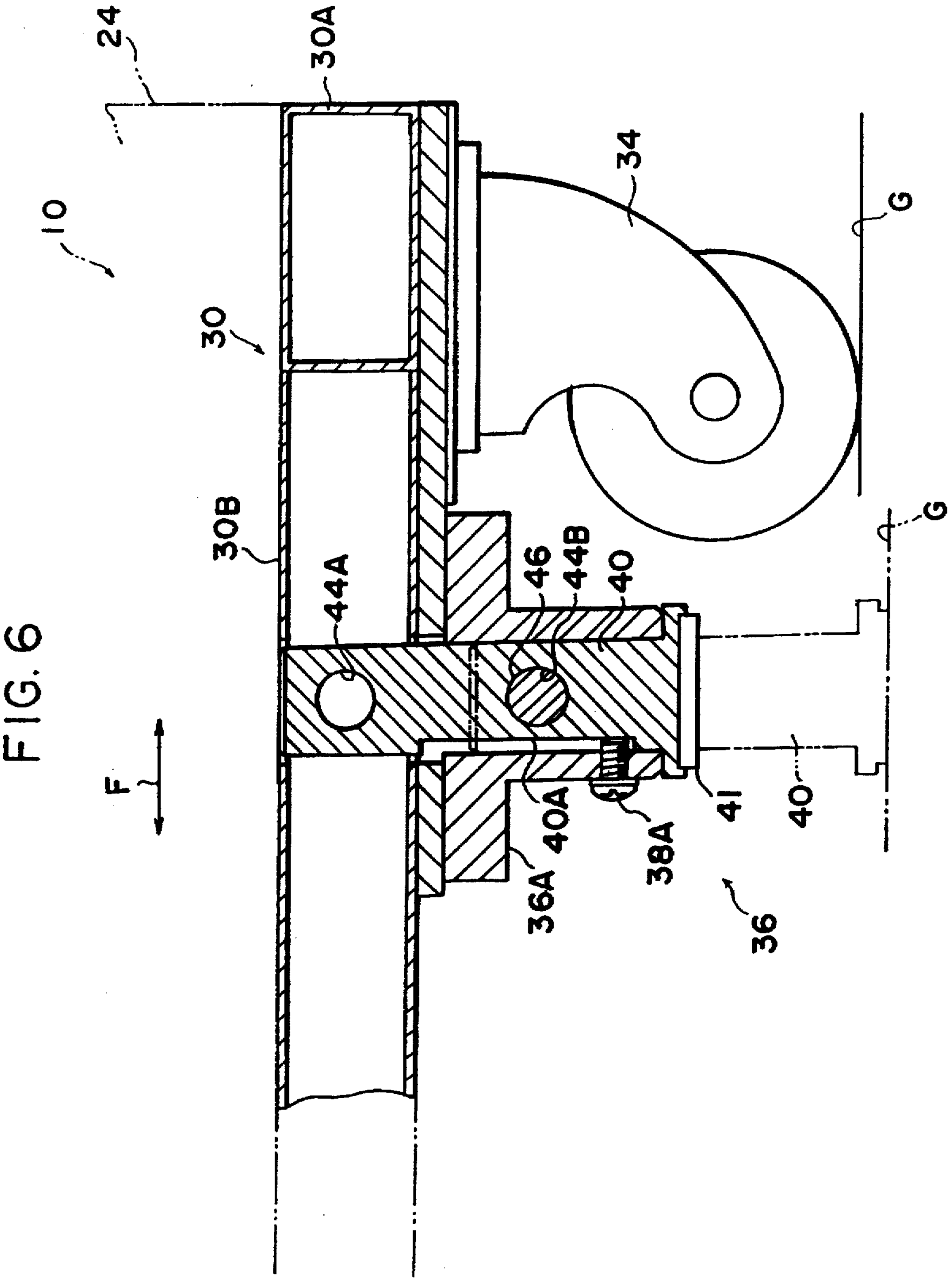
FIG. 6 is a sectional view of principal portions, taken along line 6—6 of FIG. 5.

As shown in FIG. 4, leg portions 36 are disposed at the frame 30B in vicinities of each of the free wheels 34. As shown in FIG. 5 and FIG. 6, the leg portion 36 is fixed to the frame 30B by a flange 36A provided at one end in the axial direction of a substantially cylindrical bracket 38. The leg portion 36 is formed by a substantially columnar leg 40 which is slidably insertable into the bracket 38. The leg 40 is slid and accommodated in the frame 30B in a through-hole formed coaxially with the bracket 38. A flange 41 is provided at an axial end of the leg 40 at a side opposite to the bracket 38.

The extent over which the leg 38 is slid into the bracket is controlled by a screw 38A, which is screwed into the bracket 38 and extends toward an inner surface of the bracket 38, and by a groove 40A formed along the axial direction in an outer periphery of the leg 40. Namely, an end of the screw 38A is inserted into the groove 40A and controls the sliding range of the leg 40 while also preventing the leg 40 from falling out of the bracket 38.

A through-hole 42 is provided in the bracket 38 of the leg portion 36 and penetrates through the outer periphery of the bracket 38 in the transverse direction of the printing plate stand 10. Further, through-holes 44A, 44B are formed in the outer periphery of the leg 40 respectively at an upper side and a lower side of the leg 40. The through-holes 44A, 44B both correspond to the through-hole 42.

A fixing pin 46 in insertable into and extractable from the through-holes 42, 44A, and 44B, which are formed with substantially equal diameters. When the leg 40 is slid upward and the fixing pin 46 is inserted into the through-holes 42, 44A, the leg 40 is maintained in an accommodated state (as shown by the solid line in FIG. 6). Further, when the leg 40 is withdrawn and the fixing pin 46 is inserted into the through-holes 42, 44B, the leg 40 is maintained in a state in which the leg 40 protrudes further downward of the fixed wheels 32 and the free wheels 34 (as shown in FIG. 5 and by the two-dot chained line in FIG. 6). In this case, as shown in FIG. 4, the fixed wheels 32 and the free wheels 34 are suspended above the floor G. The printing plate stand 10 is supported on the floor G by the leg portions 36 at four places.

As shown in FIG. 5, a narrowed portion 46A is formed at an end portion of the fixing pin 46. The narrowed portion 46A of the fixing pin 46, which is inserted into the through-hole 42 of the bracket 38, opposes an end of a bolt 38B. The bolt 38B is urged by an unillustrated urging force. At the end of the bolt 38B, a ball 38C, a part of which protrudes, is accommodated. The ball 38C is insertable into the bolt 38B against the urging force.

The abutting of the ball 38C on the narrowed portion 46A of the fixing pin 46 allows the fixing pin 46 to be inserted into and pulled out from the through-hole 42, and prevents the leg 40 from falling out. Further, an unillustrated wire is joined to the fixing pin 46 to prevent loss thereof.

As shown in FIG. 3, crossframes 48, which span between the frames 30B, are provided respectively at both ends in the longitudinal direction of the printing plate stand 10. At both ends of the crossframes 48, i.e., in vicinities of the frames 30B, blocks are provided which effect the above-mentioned positioning of the printing plate stand 10.

Figure 7:
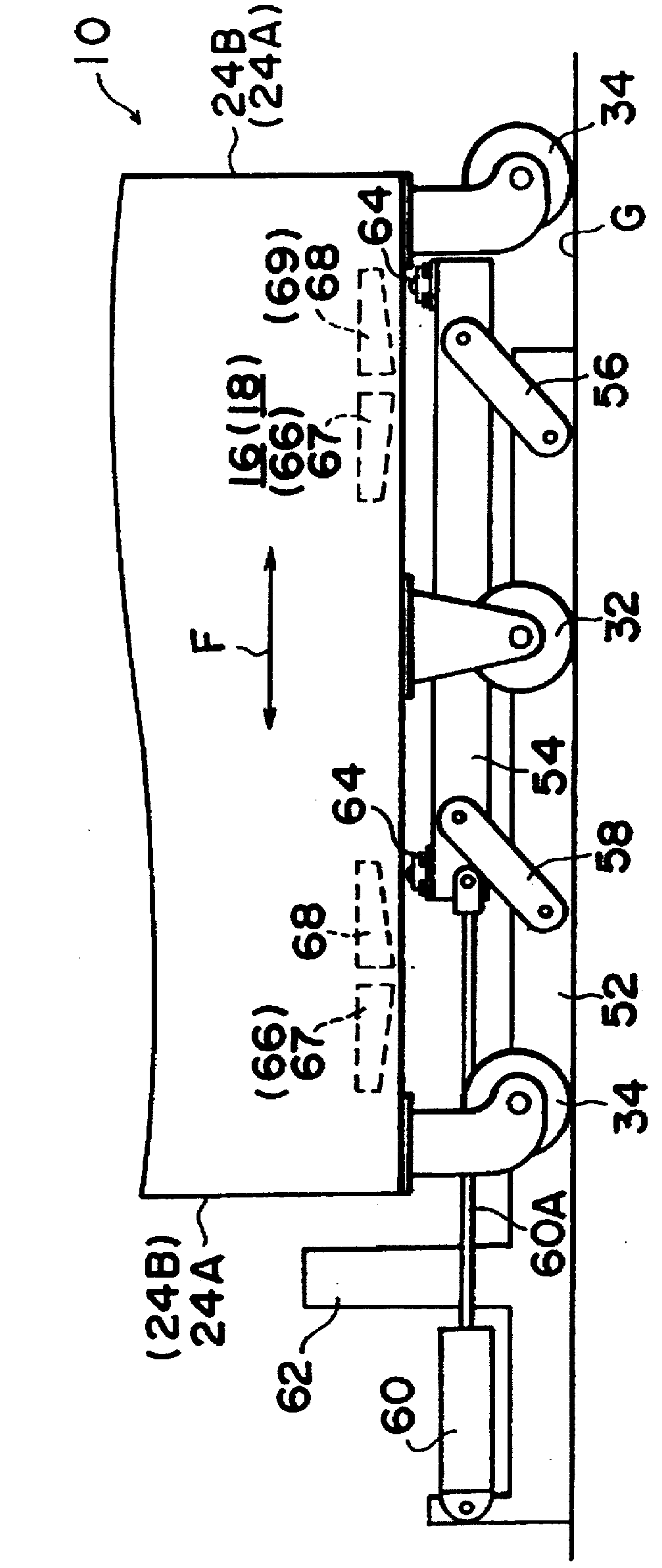
FIG. 7 is a front view of principal portions of the printing plate stand and a raising and lowering stand as seen from the transfer apparatus.
Figure 8:
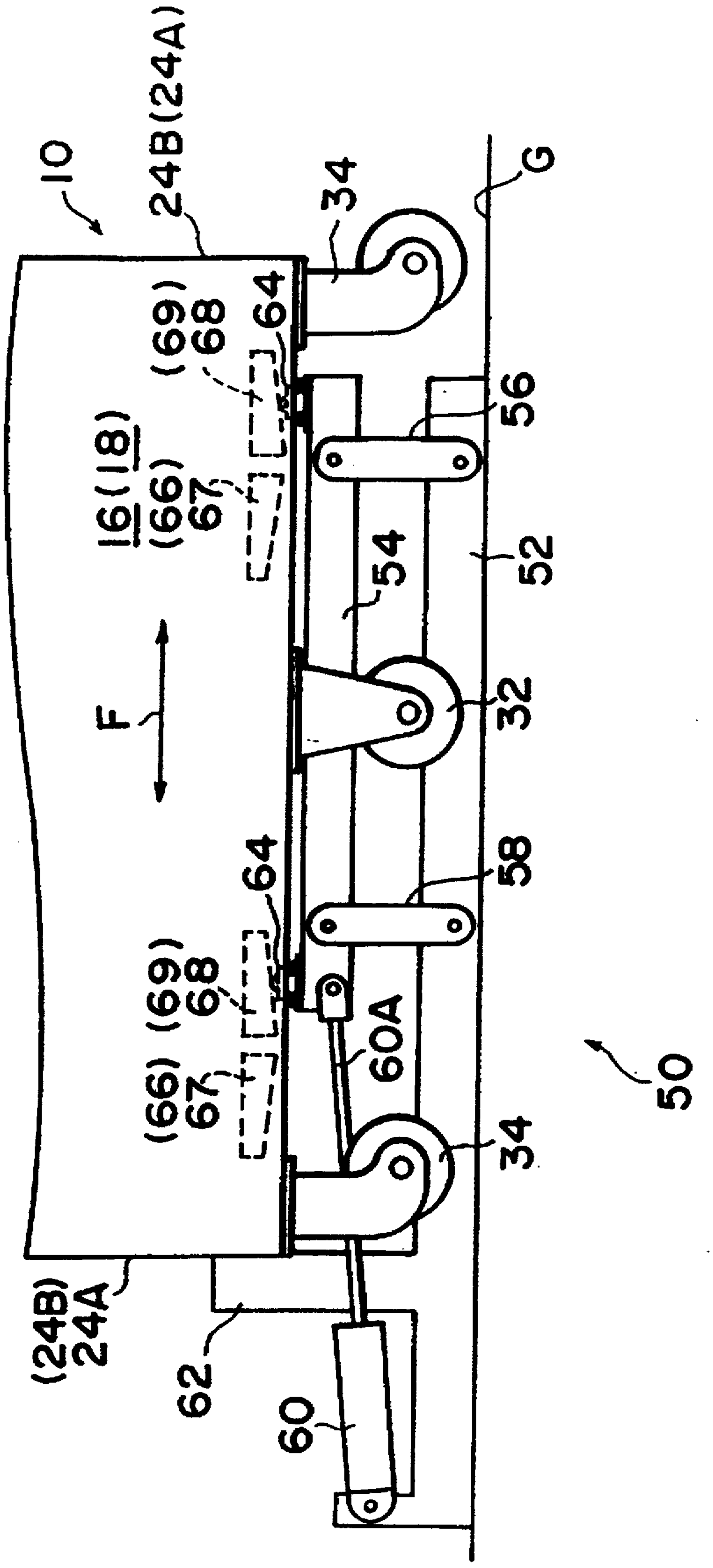
FIG. 8 is a front view of principal portions of the printing plate stand and the raising and lowering stand as seen from the transfer apparatus, and illustrates an operation of the raising and lowering stand.
Figure 9:
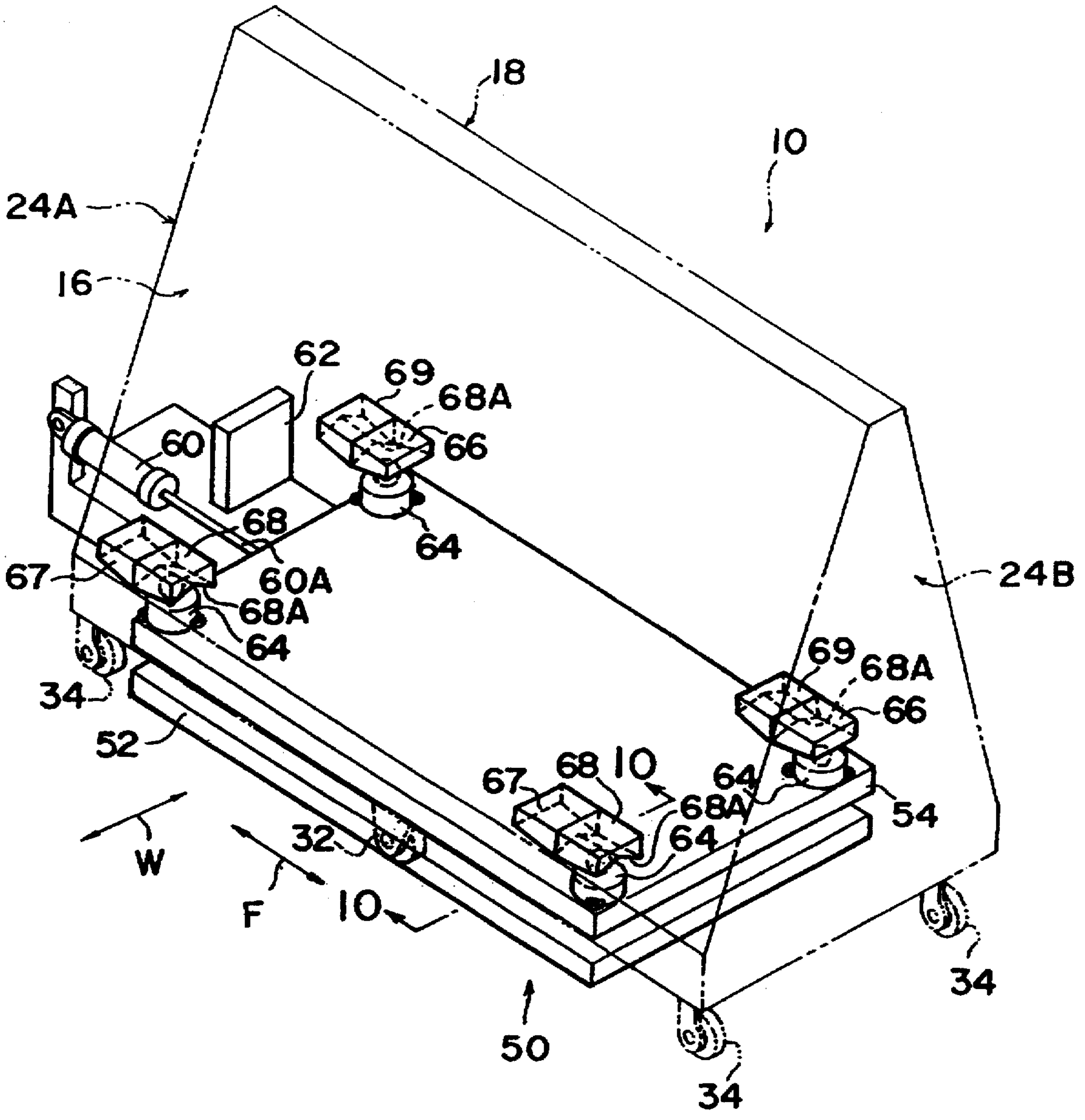
FIG. 9 is a perspective view illustrating the raising and lowering stand of the first embodiment.

A raising and lowering stand 50 is disposed on the floor G under the printing plate stand 10, which is disposed at a position at which the printing plates P are transferred to the transfer apparatus 12. As shown in FIGS. 7 through 9, the raising and lowering stand 50, has a rectangular baseplate 52, which is fixed to the floor G, and a rising and falling plate 54, which is disposed parallel to and has the same shape as the baseplate 52. The baseplate 52 and the raising and lowering plate 54 are connected by a pair of parallel links 56, 58. The pair of parallel links 56, 58 are respectively provided at both ends in the directions in which the transfer apparatus 12 and the printing plate stand 10 approach and move away from each other. The raising and lowering plate 54 can move up and down parallel to the floor G by these parallel links 56, 58.

An end of a drive shaft 60A of an air cylinder 60, whose axis is supported at the baseplate 52, is connected to the raising and lowering plate 54.

The raising and lowering plate 54 is elevated by the driving of the air cylinder 60 in a direction in which the drive shaft 60A of the air cylinder 60 is received by the air cylinder 60. The raising and lowering plate 54 raises the printing plate stand 10 until the printing plate stand 10 reaches the height at which the printing plates P are transferred to the transfer apparatus 12.

Figure 10:
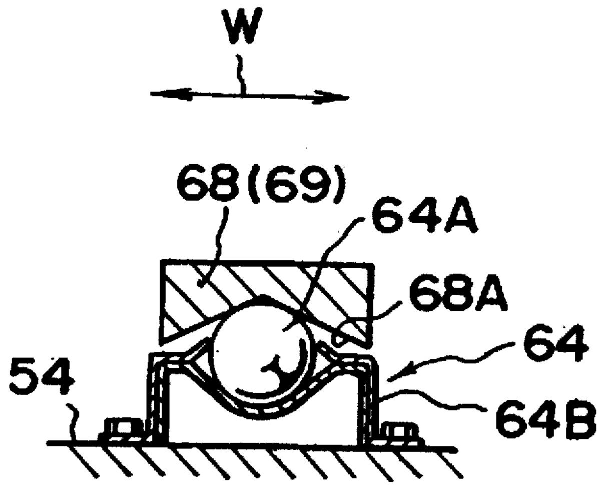
FIG. 10 is a sectional view of positioning members, taken along line 10—10 of FIG. 9 and FIG. 19.

As shown in FIG. 9, rolling ball members such as ball casters 64 are disposed in vicinities of each of the corners of the top surface of the raising and lowering plate 54. As shown in FIG. 10, at the ball caster 64, a part of a steel ball 64A is accommodated so as to rotate freely in a bracket 64B fixed to the rising and falling plate 54. Another part of the steel ball 64A protrudes out of the bracket 64B.

As shown in FIG. 9, the ball casters 64 are provided at the crossframes 48 (omitted from FIG. 9) of the printing plate stand 10. Blocks 66, 68, which are first positioning members, and blocks 67, 69, which are second positioning members, are disposed opposing each other in a predetermined state. The blocks 66, 67 have the same configuration and are formed by even surfaces inclined in the longitudinal direction of the printing plate stand 10. The printing plate stand 10 can be supported by the blocks 66, 67 abutting on the ball casters 64. Further, the blocks 68, 69 have the same configuration. Triangular grooves 68A, which extend in the longitudinal direction of the printing plate stand 10, are formed in the blocks 68, 69. As shown in FIGS. 7 through 9, as seen in the transverse direction of the printing plate stand 10, ones of ends of the blocks 68, 69 are formed as the thinnest sections of the blocks 68, 69. The blocks 68, 69 are formed so as to become gradually thicker along the longitudinal direction of the printing plate stand 10.

FIGS. 7 through 9 illustrate an arrangement of the blocks 66, 67, 68 and 69. When the front wall 16 of the printing plate stand 10 opposes the transfer apparatus 12, the two ball casters 64 on the transfer apparatus 12 side of the raising and lowering plate 54 abut on the blocks 68. The ball casters 64 on the side opposite to the transfer apparatus 12 abut on the blocks 66. The triangular groove 68A is formed to become gradually deeper from the end surface 24A toward the end surface 24B. The printing plate stand 10 is urged by its own weight along second axis F toward the end surface 24A side of the printing plate stand 10 and along an orthogonal first axis W.

Further, the bottom surfaces of the blocks 66 are also inclined from the end surface 24B side toward the end surface 24A side. Accordingly, the printing plate stand 10 is urged by its own weight along second axis F toward the end surface 24A side of the printing plate stand 10 and along first axis W.

On the other hand, when the rear wall 18 of the printing plate stand 10 is disposed to oppose the transfer apparatus 12, the ball casters 64 on the transfer apparatus 12 side abut on the blocks 69. The ball casters 64 on the side opposite the transfer apparatus 12 abut on the blocks 67. The triangular groove 68A is formed so as to become gradually deeper from the end surface 24B to the end surface 24A. Further, the bottom surface of the blocks 67 are also inclined from the end surface 24A side toward the end surface 24B side. Accordingly, the printing plate stand 10 is urged by its own weight toward the end surface 24B side of the printing plate stand 10. Incidentally, in each of the drawings, the reference numerals in parentheses refer to the case in which the rear wall 18 of the printing plate stand 10 is opposed to the transfer apparatus 12.

A stopper 62 is provided in the vicinity of the drive shaft 60A of the air cylinder 60 and projects upward from the baseplate 52. The positioning of the printing plates P, which are loaded at the front wall 16 of the printing plate stand 10, with respect to the transfer apparatus 12 can be effected by the abutting of the stopper 62 on the frame 30A of the end surface 24A side. Further, the positioning of the printing plates P loaded at the rear wall 18 can be effected by the abutting of the stopper 62 on the frame 30A of the end surface 24B side.

Namely, when the front wall 16 is opposed to the transfer apparatus 12, the end surface 24A of the printing plate stand 10 is taken as the reference for positioning, and positioning is effected by the blocks 66, 68. Further, when the rear wall 18 is opposed to the transfer apparatus 12, the end surface 24B is taken as the reference position, and positioning is effected by the blocks 67, 69.

As shown in FIG. 1, in the transfer apparatus 12, a suction cup 70 is mounted to a drive mechanism 72. The suction cup 70 sucks a lower portion of the topmost of the printing plates P from the printing plate stand 10, which is opposed adjacent to the transfer apparatus 12 at the transfer height. The lower portion of the printing plate P is accommodated in a V-shaped groove 74A of a support angle 74. A separating bar 76 is provided at a side of the support angle 74 opposite to a side at which the suction cup 70 is disposed. An intermediate portion and an upper portion of the printing plate P are drawn away from the printing plate stand 10 by the elevating of the separating bar 76, and are accommodated at a support stand 78 of the transfer apparatus 12. After being accommodated in the transfer apparatus 12, the printing plate P is transported into the printing apparatus 14 along the support stand 78.

Next, the operation of the first embodiment will be described.

At both the front wall 16 and the rear wall 18 of the printing plate stand 10, a plurality of the printing plates P is loaded in a stack. Ends of the printing plates P, which are loaded on the front wall 16, are uniformly aligned at the end surface 24A side by the bracket 22 and the stopper 22A. Further, ends of the printing plates P, which are loaded on the rear wall 18, are uniformly aligned at the end surface 24B side by the bracket 22 and the stopper 22A. As a result, the printing plates P loaded at respective surfaces of the front wall 16 and the rear wall 18 are accurately positioned with respect to the printing plate transfer apparatus 12 even if the printing plates P are of different sizes.

By placing the handle bar 26, shown in FIG. 3, in the horizontal state, a worker can move the printing plate stand 10 by either pushing or pulling. Accordingly, the printing plate stand 10 can be moved in the longitudinal direction, i.e., in the direction of arrow F.

Because the pair of fixed wheels 32 is disposed in a central portion in the longitudinal direction of the lower frame 30, the movement of the printing plate stand 10 in the longitudinal direction is easy. Namely, although the free wheels 34 are disposed at both ends in the longitudinal direction, the pair of fixed wheels 32 moves only forward and backward. Consequently, movement of the printing plate stand 10 straight forward and straight backward is extremely stable.

In addition, because the fixed wheels 32 protrude slightly more than the free wheels 34, the fixed wheels 32 always contact the ground G. The difference in the amounts by which the fixed wheels 32 and the free wheels 34 protrude may be several millimeters.

Figure 11A:
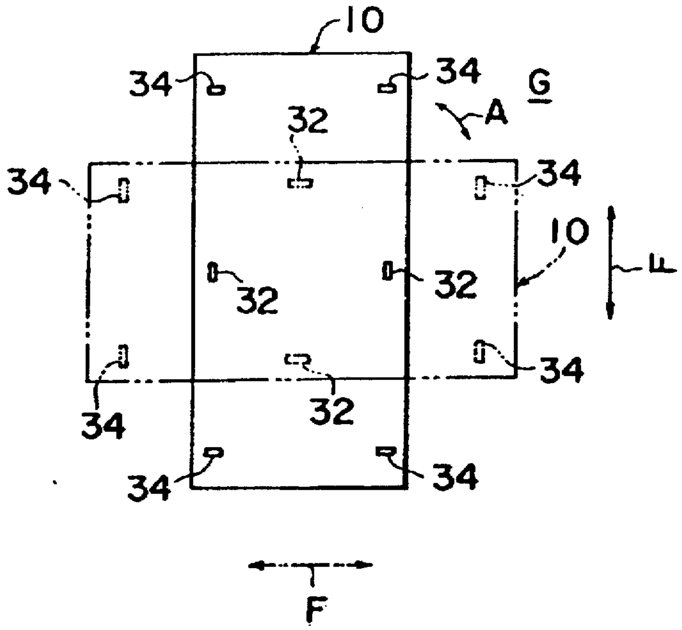
FIG. 11A is a schematic plan view illustrating a changing of direction of the printing plate stand of the first embodiment.

The direction of the printing plate stand 10 is changed by pushing on one end in the longitudinal direction thereof. As shown in FIG. 11A, by pushing one end in the longitudinal direction of the printing plate stand 10 in the direction of arrow A, the direction of the free wheels 34 changes, and the free wheels 34 move in the direction in which they are pushed. As a result, the printing plate stand 10 rotates, with a point midway between the pair of fixed wheels 32 as the center of rotation, and the direction of the printing plate stand 10 is changed. The direction of the printing plate stand 10 can thereby be changed in a narrow space.

Figure 11B:
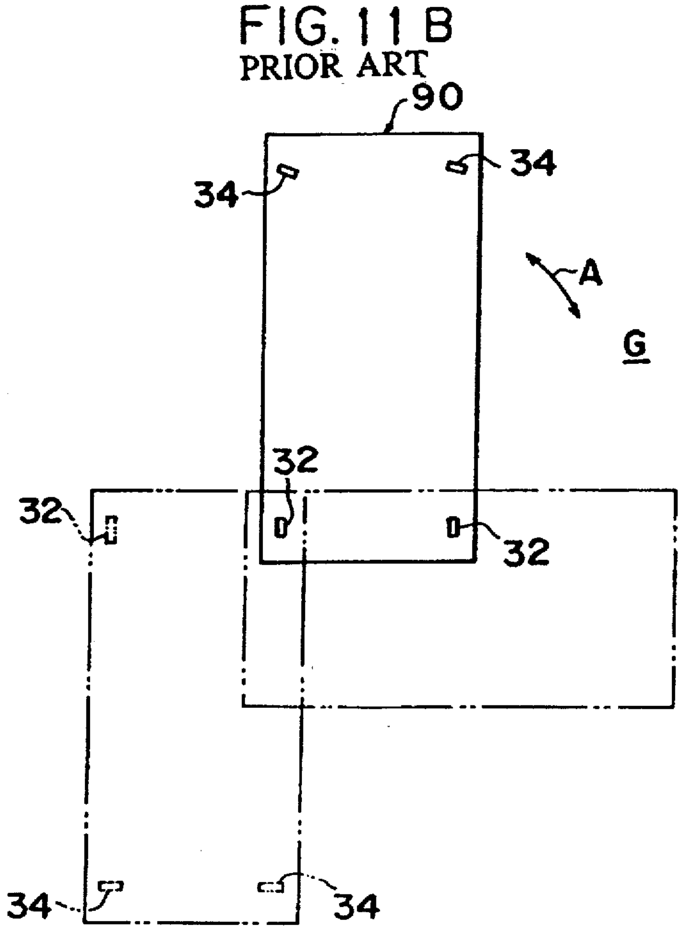
FIG. 11 B PRIOR ART
FIG. 11B is a schematic plan view illustrating a changing of direction of a conventional printing plate stand.

At the printing plate stand 90 shown in FIG. 11B, the pair of fixed wheels 32 is disposed at one end thereof. When the printing plate stand 90 is rotated in the direction of arrow A, the fixed wheels 32 on the one end become the center of rotation, and the free wheels 34 and the fixed wheels 34 at another end of the printing plate stand 90 move. Accordingly, changing the direction of the printing plate stand 90 requires a large space.

Further, when the printing plate stand 10 is stored or transported by a vehicle or by other means, inadvertent movement of the printing plate stand 10 by the wheels can be avoided. Namely, as shown in FIGS. 4 through 6, when the printing plate stand 10 is loaded onto a shelf or into a vehicle or the like by a forklift or by other means, when the printing plate stand 10 is being held up by the forklift, one end of the fixing pin 46 is pulled out from the leg portion 36, and the leg 40 protrudes. Thereafter, the fixing pin 46 is inserted into the through-holes 42, 44, and the leg 40 is fixed in a protruded state.

As a result, the printing plate stand 10 is supported by the four leg portions 36 whose flanges 41 at ends of the legs 40 each contact the floor G. The fixed wheels 32 and the free wheels 34 are all suspended above the floor G. The printing plate stand 10 cannot be easily moved because the fixed wheels 32 and the free wheels 34 are in this suspended state. The printing plate stand 10 is thereby reliably supported on the floor G by the four leg portions 36. In this case, the fixed wheels 32 and the free wheels 34 do not have to be completely separated from the floor G and may slightly contact the floor G.

Further, when the printing plate stand 10 is to be set down by the forklift or other means, as the printing plate stand 10 is suspended above the floor G by the forklift, one end of the fixing pin 46 is pulled out of the leg portion 36. With the leg 40 being accommodated within the bracket 38, the fixing pin 46 is inserted into the through-holes 42, 44B. The leg 40 is thereby fixed in an accommodated state. Consequently, the printing plate stand 10 can be supported on the floor G by the fixed wheels 32 and the free wheels 34.

In this way, the printing plate stand 10, which is transported and moved manually by a worker, is positioned in order to supply printing plates P to the transfer apparatus 12 such that one of the surfaces of either the front wall 16 or the rear wall 18, which are the pair of printing plate loading portions, is opposed to the transfer apparatus 12. In this case, the printing plate stand 10 is moved toward the transfer apparatus 12 from the longitudinal direction.

As shown in FIGS. 1, 2 and 9, the printing plate stand 10 is opposed to the transfer apparatus 12 and is disposed above the raising and lowering stand 50. Thereafter, as shown in FIG. 7 and FIG. 8, the air cylinder 60 of the raising and lowering stand 50 is driven, and the rising and falling plate 54 is elevated by the parallel links 56, 58.

As a result, the ball casters 64 at the transfer apparatus 12 side of the raising and lowering plate 54 abut on the blocks 68. The ball-casters 64 on the side opposite the transfer apparatus 12 abut on the blocks 66. Further, by the elevating of the raising and lowering plate 54 by the air cylinder 60, the printing plate stand 10 moves along the triangular groove 68A by its own weight along first axes W and second axes F.

The abutting of the bottom of the end surface 24A of the printing plate stand 10 on the stopper 62 of the rising and falling stand 50 stops the movement of the printing plate stand 10. The driving of the air cylinder 60 stops when the raising and lowering plate 54 reaches a predetermined height, and maintains the raising and lowering plate 54 at that height. Accordingly, the transfer position and height of the printing plate stand 10 with respect to the transfer apparatus 12 are set.

Figure 12:
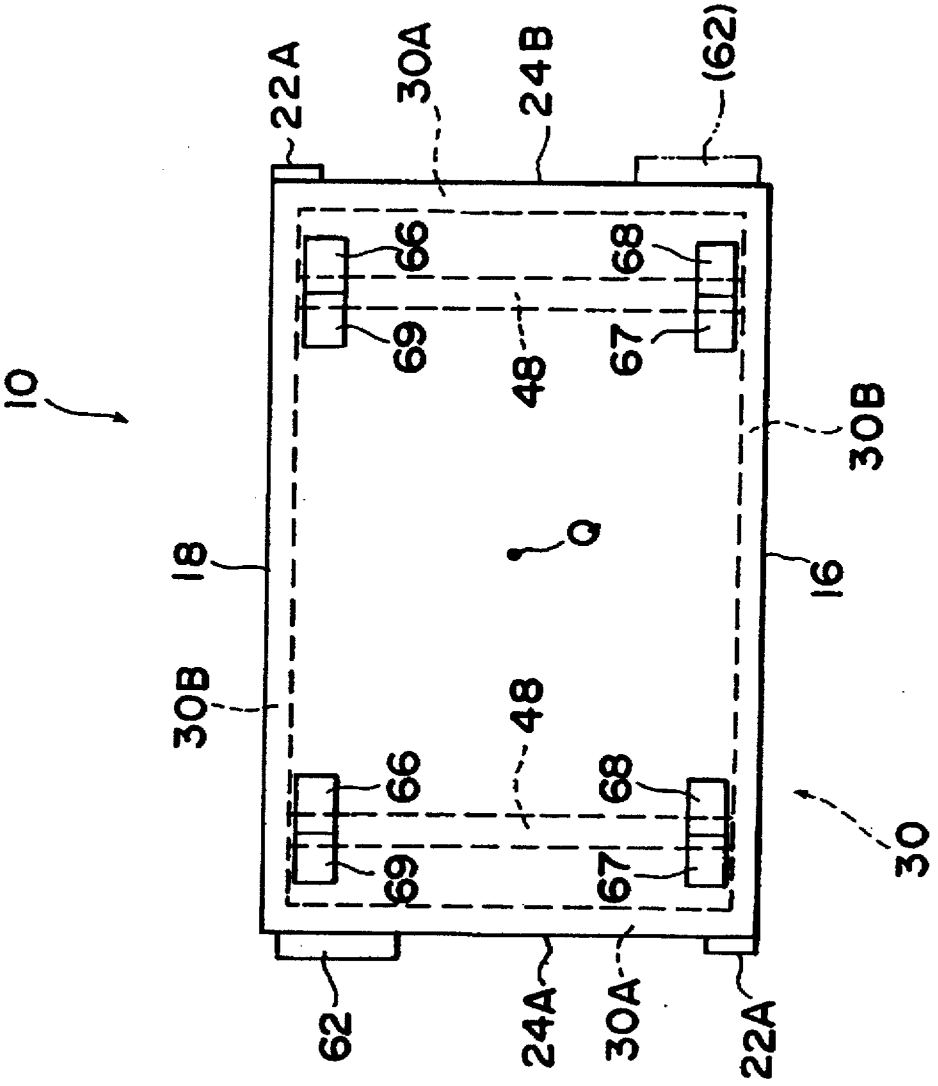
FIG. 12 is a schematic plan view illustrating an arrangement of positioning members.

After all of the printing plates P loaded on one surface of the printing plate stand 10 have been supplied to the transfer apparatus 12, the air cylinder 60 is driven to lower the raising and lowering plate 54. The printing plate stand 10 is pulled away from the transfer apparatus 12. Thereafter, the printing plate stand 10 is rotated, and the other surface is disposed to oppose the transfer apparatus 12. Positioning is effected in the same way as above. In this case, the ball casters 64 on the transfer apparatus 12 side abut on the blocks 69. The ball casters 64 on the side opposite the transfer apparatus 12 abut on the blocks 67. As shown in FIG. 12, at the printing plate stand 10, positioning is effected by the bottoms of the end surfaces 24A, 24B, i.e., the frames 30A of the lower frame 30, being taken as reference positions and abutting on the stopper 62 of the raising and lowering stand 50. These reference positions which abut on the stopper 62 have point symmetry about point Q, the center point of the lower frame 30. Further, the blocks 66, 68 are first positioning members, and the blocks 67, 69 are second positioning members. The blocks 66 are disposed symmetrically to the blocks 67 about center point Q. The blocks 68 are disposed symmetrically to the blocks 69 about center point Q. Positioning of the printing plate stand 10 when the front wall 16 and the rear wall 18 respectively oppose the transfer apparatus 12 can be affected by the ball casters 64 of the raising and lowering stand 50 being positioned opposing the blocks.

In the first embodiment, the blocks 68 are provided with the triangular grooves 68A formed therein in the longitudinal direction of the printing plate stand 10. However, the first embodiment is not limited to the same; it is suitable if the ball casters 64 effect positioning by moving along inclined surfaces of triangular grooves or along grooves. The configurations of the blocks 66, 67, 68 and 69 are not limited.

In addition, in the first embodiment, positioning in the directions in which the printing plate stand 10 and the transfer apparatus 12 approach and move away from each other is effected by the triangular grooves 68A provided in the blocks 68, 69. Positioning in the longitudinal direction is effected by the stopper 62 provided on the rising and falling stand 50. However, positioning in the longitudinal direction may be performed by the triangular grooves 68A. Positioning in the directions of approaching and moving away may be effected by providing a stopper on the raising and lowering stand 50.

The blocks 66, 67, 68 and 69 are provided at the printing plate stand 10, and the ball casters 64 are provided at the raising and lowering plate 54 of the raising and lowering stand 50. However, the blocks 66, 67, 68 and 69 may be provided at the raising and lowering plate 54. The ball casters 64 may be provided at the bottom surface of the printing plate stand 10.

Figure 13:
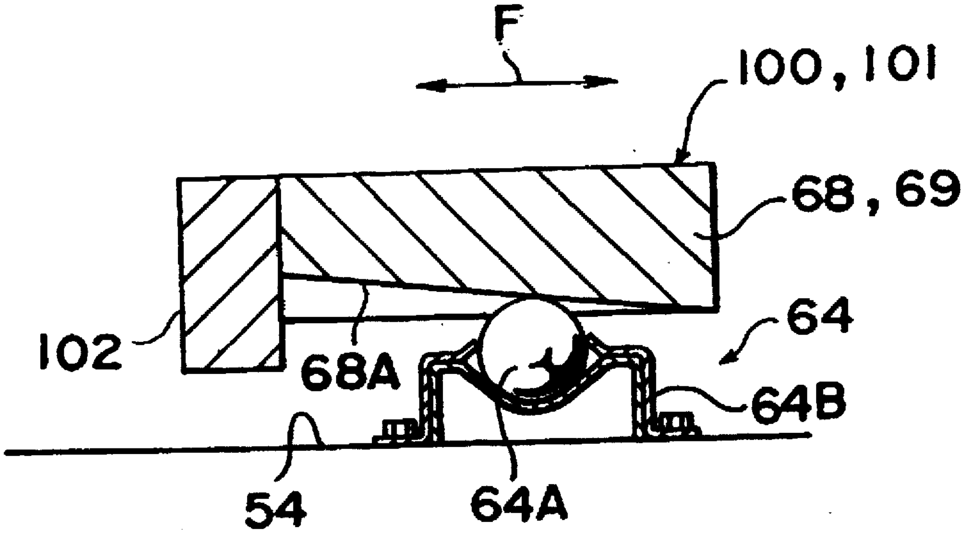
FIG. 13 is a sectional view of principal portions, similar to those of FIG. 10, of a block of a second embodiment.

In FIG. 13, blocks 100, 101 of the second embodiment are illustrated. In the second embodiment, parts which are basically the same as those in the first embodiment are used. The same reference numerals are used for the same parts, and descriptions thereof are omitted.

At the blocks 100, 101, stoppers 102, which are block-shaped protrusions, are provided at an end portion along the triangular groove 68A of the blocks 68, 69.

When the printing plate stand 10 is elevated by the driving of the air cylinder 60 of the raising and lowering stand 50, the printing plate stand 10 moves along the triangular groove 68A of the block 100. The abutting of the brackets 64B of the ball casters 64 on the stoppers 102 stops the movement of the printing plate stand 10. Positioning of the printing plate stand 10 can be effected by taking the position at which the printing plate stand 10 is stopped as the predetermined position of the printing plate stand 10 with respect to the transfer apparatus 12. Further, even if the printing plate stand 10 is rotated and the ball casters 64 abut on the blocks 101, positioning is effected in the same way. Namely, in the first embodiment, the stopper 62 is provided at the raising and lowering stand 50 in order to effect positioning of the printing plate stand 10 in the longitudinal direction. In the second embodiment, positioning of the printing plate stand 10 in the longitudinal direction is effected by the blocks 100, 101, at which the stoppers 102 are provided at the blocks 68, 69.

Even if the stoppers 102 are provided on the blocks 66, 67, positioning can be effected in the same way.

Figure 14:
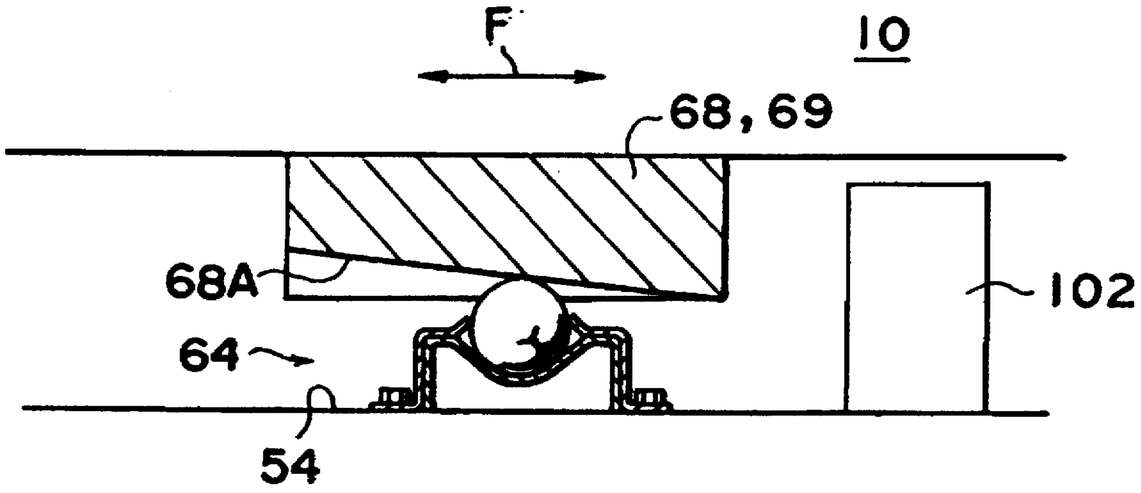
FIG. 14 is a sectional view of a second embodiment of a variation of the principal portions illustrated in FIG. 13.

Further, as shown in FIG. 14, the stopper 102, which is a block-shaped projection, may be disposed at the raising and lowering plate 54 of the raising and lowering stand 50. Accordingly, the top surface of the stopper 102 may abut on the bottom surface of the printing plate stand 10, which moves along the inclined surfaces of the blocks 66, 67, 68 and 69 and along the triangular grooves 68A. Moreover, the stopper 102 may abut on any of the blocks 66, 67, 68 and 69. A projection which opposes the stopper 102 may be provided on the bottom surface of the printing plate stand 10. In other words, it suffices that the printing plate stand 10 is elevated by the raising and lowering stand 50, is moved along the inclined surfaces of the blocks 66, 67, 68 and 69 or along the triangular grooves 68A to the predetermined position, and is positioned by one of the above-described stoppers.

Figure 15:
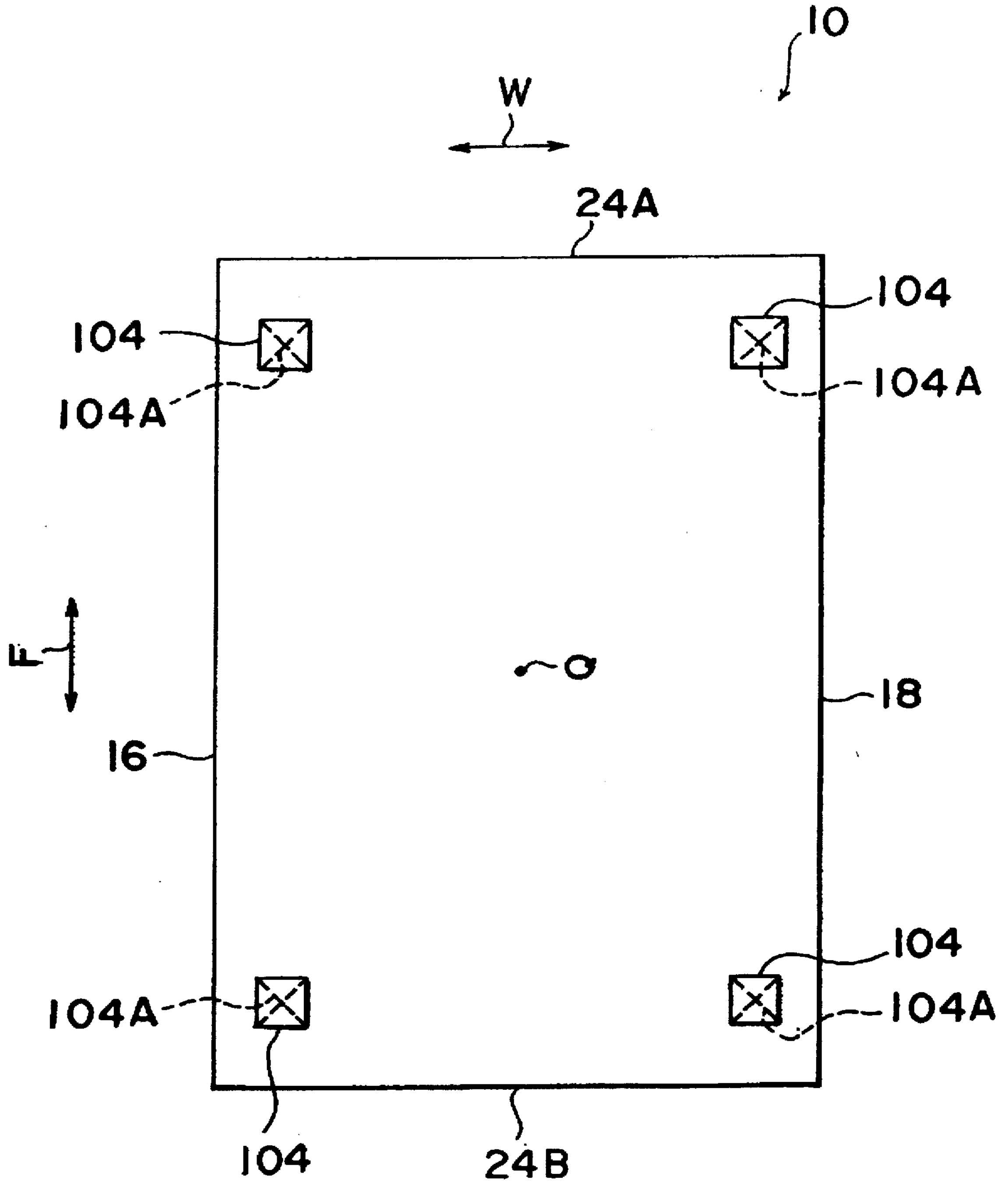
FIG. 15 is a schematic plan view illustrating a second embodiment of a variation of the arrangement illustrated in FIG. 12.

As shown in FIG. 15, depressions 104A; which are shaped as square-based pyramids, are formed in blocks 104.

The ball casters 64 are movable along each of the inclined surfaces of the depressions 104A. The blocks 104, in which the depressions 104A are formed, are disposed with point symmetry about the center point Q of the bottom surface of the printing plate stand 10. The inclined surfaces of the depressions 104A may face the transverse directions and the longitudinal directions of the printing plate stand 10. Grooves formed by these inclined surfaces may face the transverse directions and the longitudinal directions of the printing plate stand 10. Incidentally, in FIG. 15, the inclined surfaces of the blocks 104 face the transverse directions and the longitudinal directions of the printing plate stand 10.

When the printing plate stand 10 is elevated by the raising and lowering stand 50, the ball casters 64 abut on each of the depressions 104A of the blocks 104. Further, when the raising and lowering plate 54 is elevated by the raising and lowering stand 50, the ball casters 64 move along the inclined surfaces of the depressions 104A to the center of the depression 104A. Thereafter, the movement of the ball casters 64, i.e., the movement of the printing plate stand 10, stops. The positioning of the printing plate stand 10 can thereby be effected.

Positioning can be effected for either the front wall 16 or the rear wall 18 by the same blocks 104. Namely, the first positioning means can serve as the second positioning means and vice-versa.

Incidentally, in the second embodiment as well, the ball casters 64 may be provided at the bottom surface of the printing plate stand 10, and the blocks may be disposed at the raising and lowering plate 54 of the raising and lowering stand 50.

As shown in the first and the second embodiments, the positioning members, which move the printing plate stand 10 to the predetermined position with respect to the transfer apparatus 12, may be interposed between the printing plate stand 10 and the raising and lowering stand 50 during positioning. The positioning members, which are provided to stop the printing plate stand 10 at the predetermined position, may be disposed at the printing plate stand 10 or at the raising and lowering stand 50.

Figure 16:
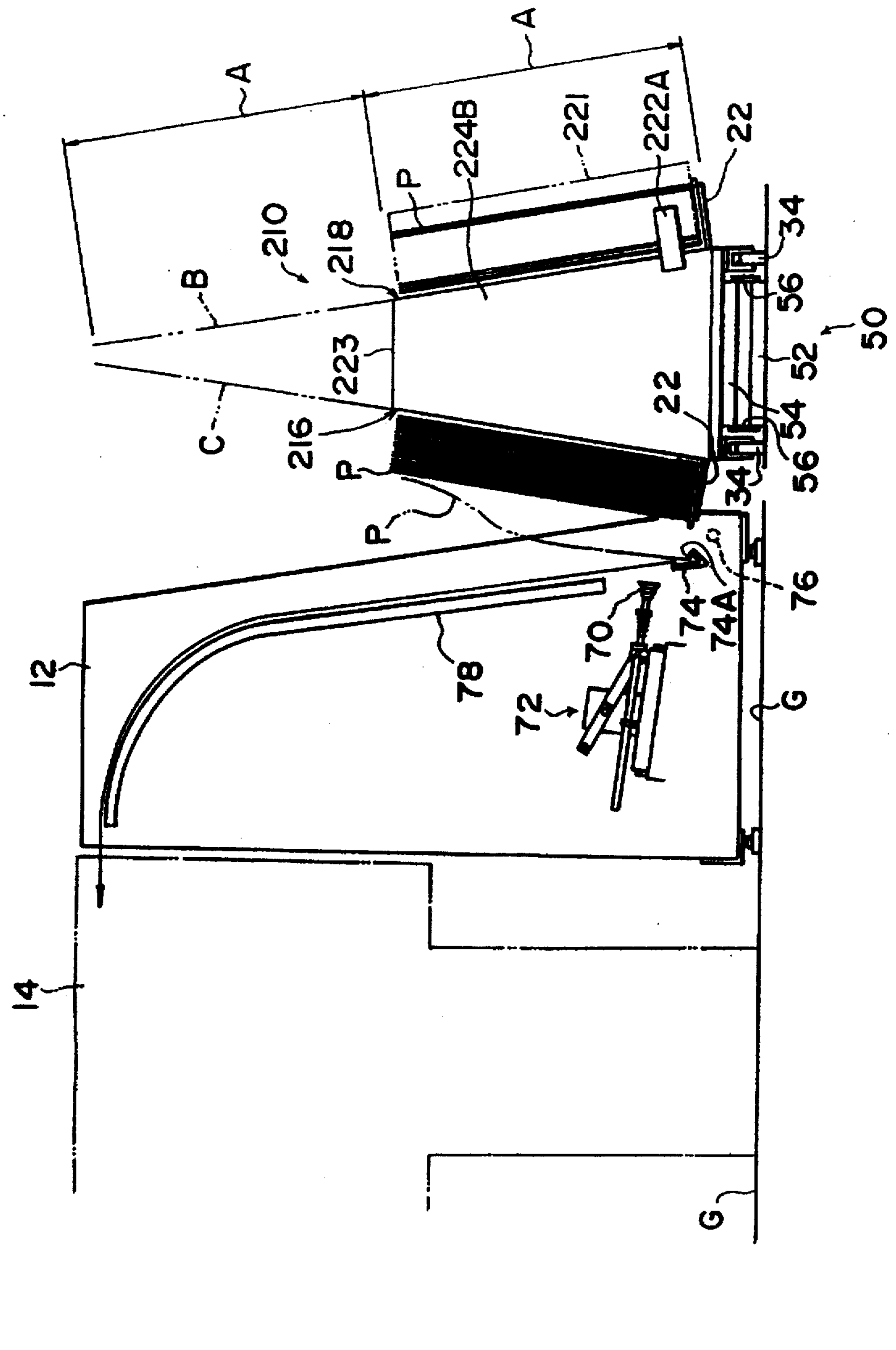
FIG. 16 is a side view illustrating an arrangement of a transfer apparatus and a printing plate stand of the third embodiment.
Figure 17:
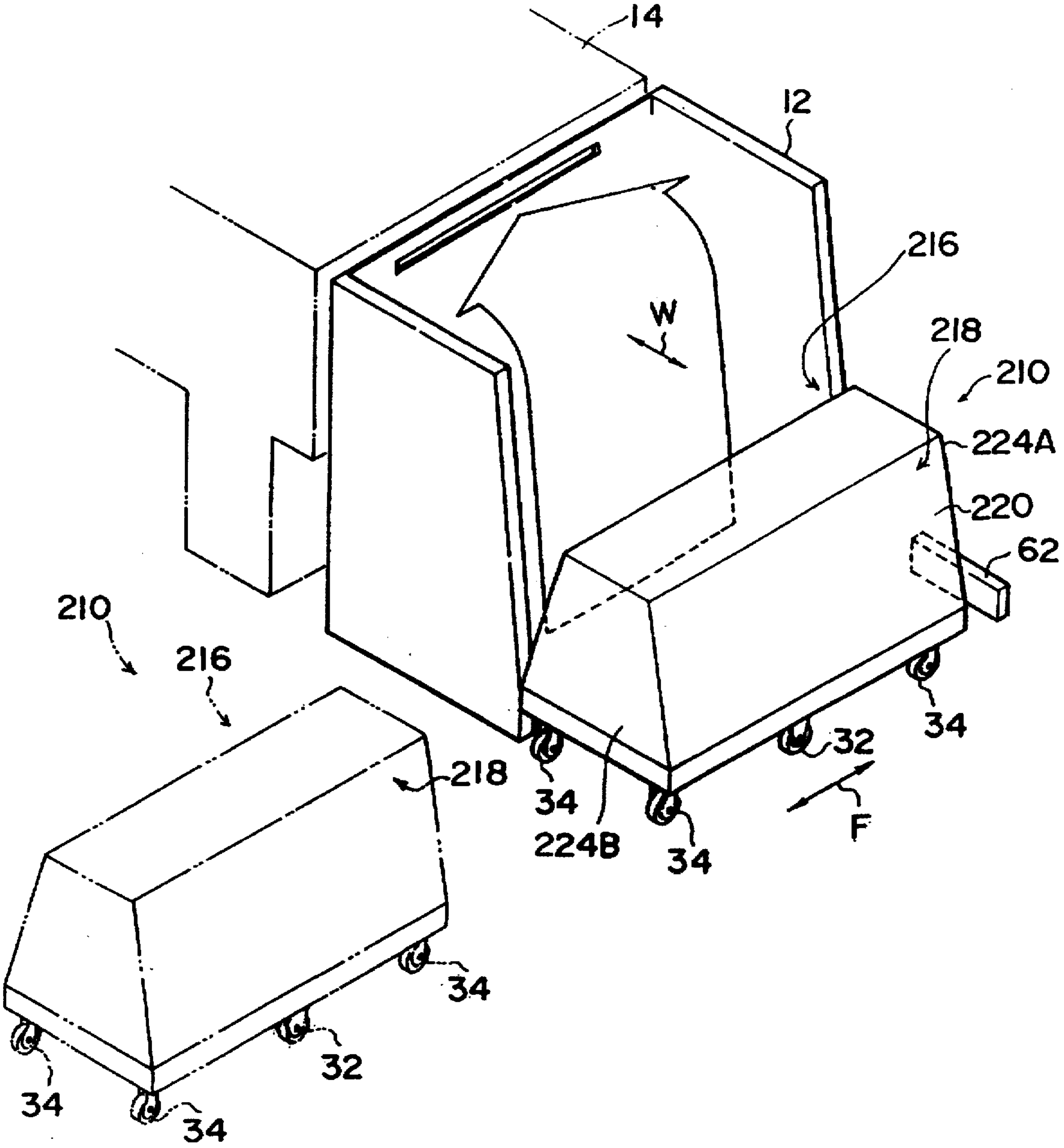
FIG. 17 is a perspective view illustrating the arrangement of the transfer apparatus and the printing plate stand of the third embodiment.

In FIGS. 16 and 17, a printing plate stand 210 of the third embodiment is disposed opposing the transfer apparatus 12 of the printing apparatus 14. Incidentally, in each of the drawings, arrow W designates the directions in which the transfer apparatus 12 and the printing plate stand 210 approach and move away from each other (the transverse direction). Arrow F refers to the longitudinal direction of the printing plate stand 210.

Figure 18:
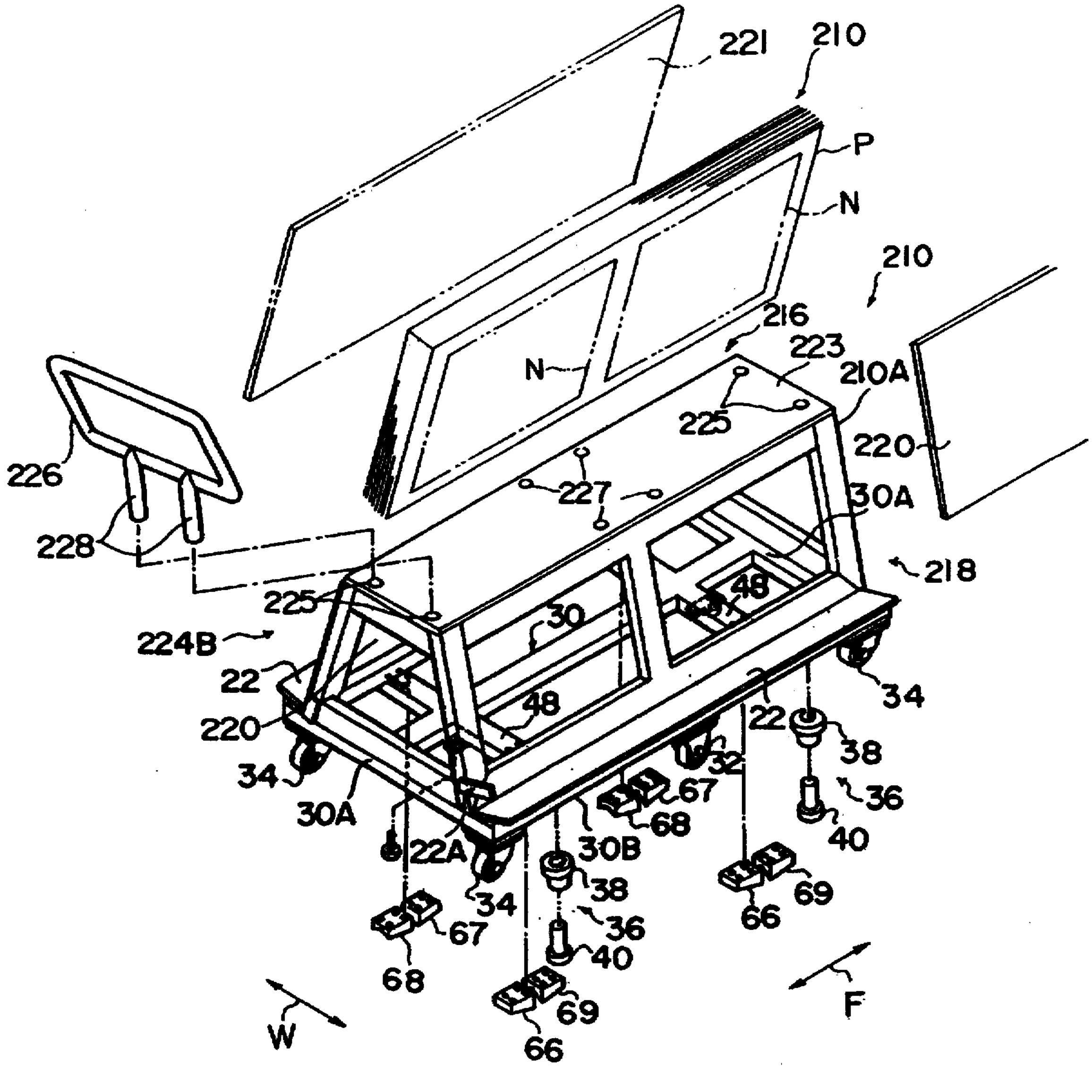
FIG. 18 is an exploded perspective view illustrating the printing plate stand of the third embodiment.

In FIG. 18, the printing plate stand 210 is illustrated in detail. The printing plate stand 210 is formed of a plurality of frames 210A fastened together. Front wall 216 and rear wall 218 are inclined in directions in which their respective top ends approach each other. Further, the top ends of the front wall 216 and the rear wall 218 are connected by a top plate 223. As viewed from the longitudinal direction of the printing plate stand 210 (the direction designated by arrow F), the printing plate stand 210 is formed as a substantial trapezoid with even legs.

Further, as shown in FIG. 16, extended lines B, C (both represented in the drawing by two-dot chained lines) extend respectively from the top ends of the front wall 216 and the rear wall 218, following the respective slopes of the front wall 216 and the rear wall 218. Ends of the extended lines B, C are separated, i.e., do not intersect, at a position located at a dimension A, which is the length of the slope of the front wall 216, i.e., the length of the slope of the rear wall 218. Accordingly, the printing plate stand 210 is approximately half the height of a printing plate stand used for large printing plates (see FIG. 21).

In addition, support plates 220 are disposed at the inclined surfaces in the transverse direction, i.e., at the front wall 216 and the rear wall 218, and cover the frame 210A. Both the front wall 216 and the rear wall 218 are planar. The brackets 22, which project toward the outer sides in the transverse direction of the printing plate stand 210, are provided along the longitudinal direction at the bottom end portions of the front wall 216 and the rear wall 218 respectively.

As shown in FIG. 16, the brackets 22 can hold bottom edges of a plurality of small plates, i.e., printing plates P that are the size of two newspaper pages. Accordingly, respective surfaces of the front wall 216 and the rear wall 218 of the printing plate stand 210 are a pair of printing plate loading portions on each of which a plurality of stacked printing plates P can be loaded. The front wall 216 and the rear wall 218 of the printing plate stand 210 are set to a size of printing plates P, which are sizes of two pages of newspaper. Incidentally, in the drawings, reference letter N inside the printing plates P refers to the size of one page of newspaper.

The stoppers 22A, which are shaped like flat boards, are provided respectively along side surfaces of both ends of the printing plate stand 210 in the longitudinal direction, i.e., along end surfaces 224A, 224B. The stopper 22A provided at the end surface 224A side projects toward the front wall 216 side. The stopper 22A provided at the end surface 224B side projects toward the rear wall 218 side. The printing plates P are stacked on the surface plates 220. The end portions of the printing plates P abut on the respective brackets 22 and the stoppers 22A at both the front wall 216 and the rear wall 218 of the printing plate stand 210. Incidentally, the stoppers 22A may be detachable.

When the printing plate stand 210 of the third embodiment is transported with a plurality of the printing plates P loaded in stacks on the front wall 216 and the rear wall 218, a wear plate 221, made of plastic or wood, is placed on the uppermost of the stacked printing plates P. An unillustrated belt is wrapped around the printing plate stand 210 either horizontally or vertically. When the printing plate stand 210 is made to approach the printing plate transfer apparatus as described above, the belt and the wear plates 221 are removed.

In both end portions in the longitudinal direction of the top plate 223 of the printing plate stand 210, two through-holes 225 are respectively formed such that their axes are vertical. A pair of legs 228 of a handle 226 are respectively insertable into the through-holes 225. The handle 226 is formed in a shape in which a pipe is bent into a substantially rectangular form and both ends thereof are joined. The pair of parallel legs 228 are disposed at one side of this substantial rectangle. The legs 228 can be inserted into the through-holes up to their bases, i.e., the portions at which the legs 228 are joined to the handle 226. Projections or the like used as stoppers may be disposed at intermediate portions of the legs 228 such that the legs are inserted into the through-holes 225 up to the intermediate portions.

The handle 226 is inclined at portions at which the handle 226 is connected with the legs 228. As viewed from a side, the handle 228 is a straight line forming an obtuse angle with a connecting portion as the vertex. Therefore, when the legs 228 are inserted into the through-holes 225 of the top plate 223, the top edge of the handle 226 protrudes slightly toward an outer side of the printing plate stand 210 in the longitudinal direction (in the direction of arrow F), and is at a predetermined height. The printing plate stand 210 can be moved by being pushed or pulled in the longitudinal direction by the handle 226.

In addition, two through-holes 227 are formed in the top plate 223 respectively at the front wall 216 side and the rear wall 218 side. The axial directions of the through-holes 227 are formed vertically along the respective slopes of the front wall 216 and the rear wall 218 and at intermediate portions in the longitudinal direction of the printing plate stand 210. The legs 228 of the handle 226 are insertable into the through-holes 227 at the front wall 216 side and those at the rear wall 218 side.

Figure 20:
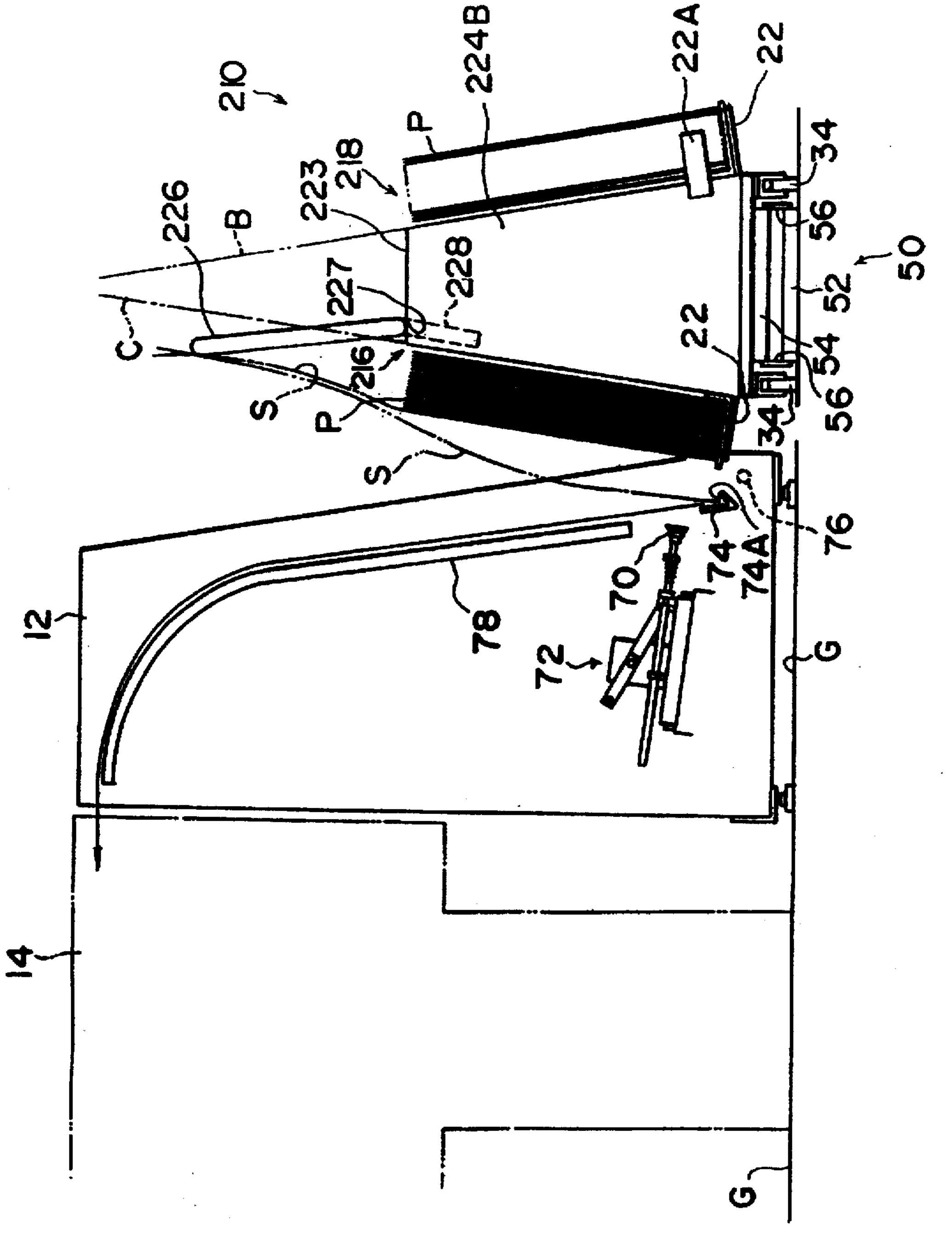
FIG. 20 is a side view, similar to that of FIG. 16, illustrating a supplying of printing plates that are the size of four newspaper pages.

As shown in FIG. 20, because the through-holes 227 are formed along the respective slopes of the front wall 216 and the rear wall 218, the handle 226, whose legs 228 are inserted into the through-holes 227, is slightly inclined from the top plate 223 towards the outer side of the printing plate stand 210. When printing plates S that are the size of four newspaper pages are loaded at the front wall 216 or at the rear wall 218, the handle 226 abuts on and supports vicinities of the top portions of the printing plates S.

Next, the operation of the third embodiment will be described.

A plurality of the printing plates P are loaded in stacks on the front wall 216 and the rear wall 218 of the printing plate stand 210. End portions of the printing plates P that are the size of two newspaper pages, which are loaded on the front wall 216, are uniformly aligned at the end surface 224A side by the bracket 22 and the stopper 22A. Edges of the printing plates P, which are loaded on the rear wall 218, are aligned at the end surface 224B side by the bracket 22 and the stopper 22A. As a result, the printing plates P, which are loaded at respective surfaces of the front wall 216 and the rear wall 218, are accurately positioned with respect to the printing plate transfer apparatus 12 even if their sizes differ.

The printing plate stand 210 can be moved by the worker pushing or pulling the printing plate stand 210 in the longitudinal direction along with the handle 226, which is inserted into the through-holes 225 of the top plate 223. The height of the printing plate stand 210 is, as a whole, low. Because the handle 226 is provided on the top plate 223, however, the worker can move the printing plate stand 210 at a moderate height.

The height of the printing plate stand 210 is about equal to the width of one page of newspaper. Because the printing plate stand 210 is short, the printing plate stand 210 can be accommodated in a shelf that has conventionally been used to accommodate a printing plate stand at which printing plates are stacked horizontally. The printing plate stand 210 can therefore be stored efficiently.

In this way, the printing plate stand 210, which has been stored or transported manually by a worker, can be positioned in order to transfer the printing plates P to the transfer apparatus 12 such that the surface of either the front wall 216 or the rear wall 218, which are the pair of printing plate loading portions, is opposed to the transfer apparatus 12. In this case, the printing plate stand 210 is moved toward the transfer apparatus 12 in the longitudinal direction.

Figure 19:
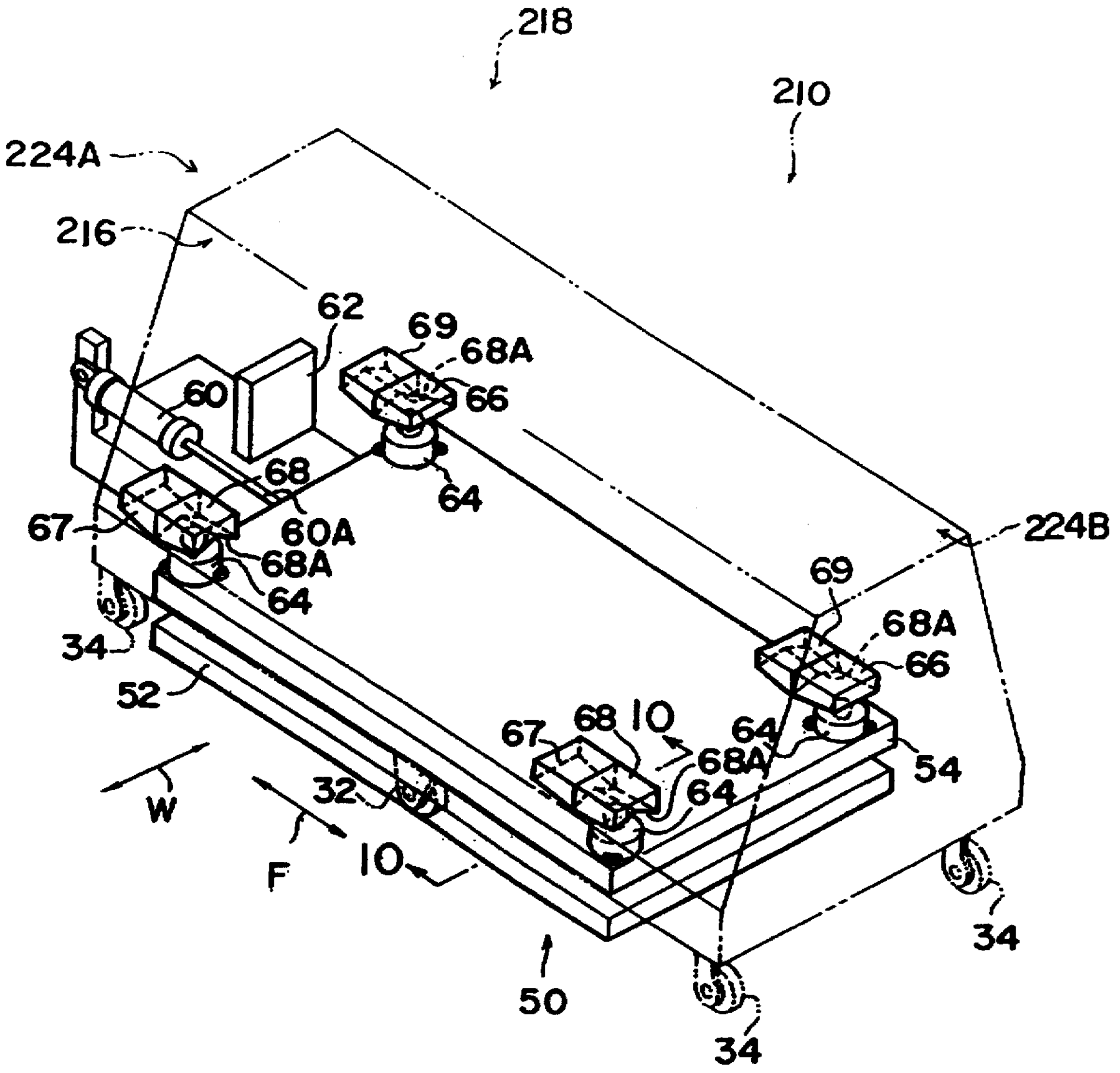
FIG. 19 is a perspective view illustrating a raising and lowering stand of the third embodiment.

As shown in FIGS. 16, 17 and 19, the printing plate stand 210 is opposed to the transfer apparatus 12 and disposed above the raising and lowering stand 50. Thereafter, as shown in FIGS. 7 and 8, the air cylinder 60 of the raising and lowering stand 50 is driven to elevate the raising and lowering plate 54 by the parallel links 56, 58.

As a result, the ball casters 64 on the transfer apparatus 12 side of the raising and lowering plate 54 abut on the blocks 68. The ball casters 64 on the side opposite the transfer apparatus 12 abut on the blocks 66. Further, the elevating of the raising and lowering plate 54 by the air cylinder 60 causes the printing plate stand 210 to move by its own weight along the triangular groove 68A.

The abutting of the bottom of the end surface 24A on the stopper 62 of the raising and lowering stand 50 stops the movement of the printing plate stand 210. The driving of the air cylinder 60 stops when the raising and lowering plate 54 reaches a predetermined height. The air cylinder 60 maintains the raising and lowering plate 54 at that height. As a result, the transfer position and height of the printing plate stand 210 with respect to the transfer apparatus 12 are set.

The printing plates P that are the size of two newspaper pages can thereby be supplied to the printing apparatus 14 via the transfer apparatus 12. Further, as shown in FIG. 20, when it is desired to supply several printing plates S that are the size of four newspaper pages while printing plates P that are the size of two newspaper pages are being supplied from the front wall 216, the handle 226 is inserted into the through-holes 227 on the front wall 216 side of the top plate 223. Thereafter, the printing plates S that are the size of four newspaper pages are loaded at the front wall 216. The printing plates S project upwardly of the front wall 216. However, vicinities of top ends of the printing plates S are supported by the handle 226 so that the printing plates S are securely loaded at the front wall 216. The printing plates S can thereby be temporarily supplied to the transfer apparatus 12.

When the printing plates S are loaded temporarily, the portions of the printing plates S from the intermediate portions thereof to the bottoms thereof contact the printing plates P and are inclined. Because the handle 226 supports portions of the printing plates S which are located slightly lower than the top edges thereof, the portions of the printing plates S from the intermediate portions thereof to the tops thereof are reliably supported. As a result, the printing plates S do not fall backwards over the handle 226, nor do the printing plates S inclined fall towards the transfer apparatus 12 when set at too steep of an incline.

In the present embodiment, as shown in FIG. 26, the handle 226 is inclined toward the transfer apparatus 12 side and projects out further than the extended line of the inclined surface of the front wall 216. The printing plates S can therefore be stably loaded at the front wall 216 regardless of the amount of printing plates P loaded thereat.

Further, in the third embodiment, as in the first embodiment, positioning may be effected not only by the blocks 68, in which the triangular grooves 68A are formed in the longitudinal direction of the printing plate stand 210, but also by the ball casters 64 moving along inclined surfaces of the triangular grooves or along the grooves. The configurations of the blocks 66, 67, 68 and 69 are not restricted.

In the first embodiment, positioning in the directions in which the printing stand 10 and the transfer apparatus 12 approach and move away from each other is effected by the triangular grooves 68A provided on the blocks 68, 69. Positioning in the longitudinal direction is effected by the stopper 62 provided on the raising and lowering stand 50. However, in the third embodiment, positioning in the longitudinal direction may be performed by the triangular grooves 68A. Positioning in the directions of approaching and moving away may be effected by the stopper disposed on the raising and lowering stand 50.

In addition, in the first embodiment, the blocks 66, 67, 68 and 69 are provided at the printing plate stand 10, and the ball casters 64 are provided at the raising and lowering plate 54 of the raising and lowering stand 50. In the third embodiment, the blocks 66, 67, 68 and 69 may be provided at the raising and lowering plate 54. The ball casters 64 may be disposed at the bottom surface of the printing plate stand 210.

The blocks 100, 101 of the second embodiment may be employed in the third embodiment in the same way as that described in the second embodiment.

When the blocks 100, 101 of the second embodiment are used in the present embodiment, the ball casters 64 may be provided at the bottom surface of the printing plate stand 210, and the blocks may be disposed at the raising and lowering plate 54 of the raising and lowering stand 50. Namely, it suffices that either the bail casters 64 or the blocks are provided at the printing plate stand 210 and are opposed to the other of either the ball casters 64 or the blocks which are disposed at the raising and lowering plate 54.

In the present embodiment as well, the positioning means, which moves the printing plate stand 210 to the predetermined position with respect to the transfer apparatus 12, may be interposed between the printing plate stand 210 and the raising and lowering stand 50 during positioning. The positioning means, which is provided to stop the printing plate stand 210 at the predetermined position, may be provided at the printing plate stand 210 or at the raising and lowering stand 50.

Figure 21:
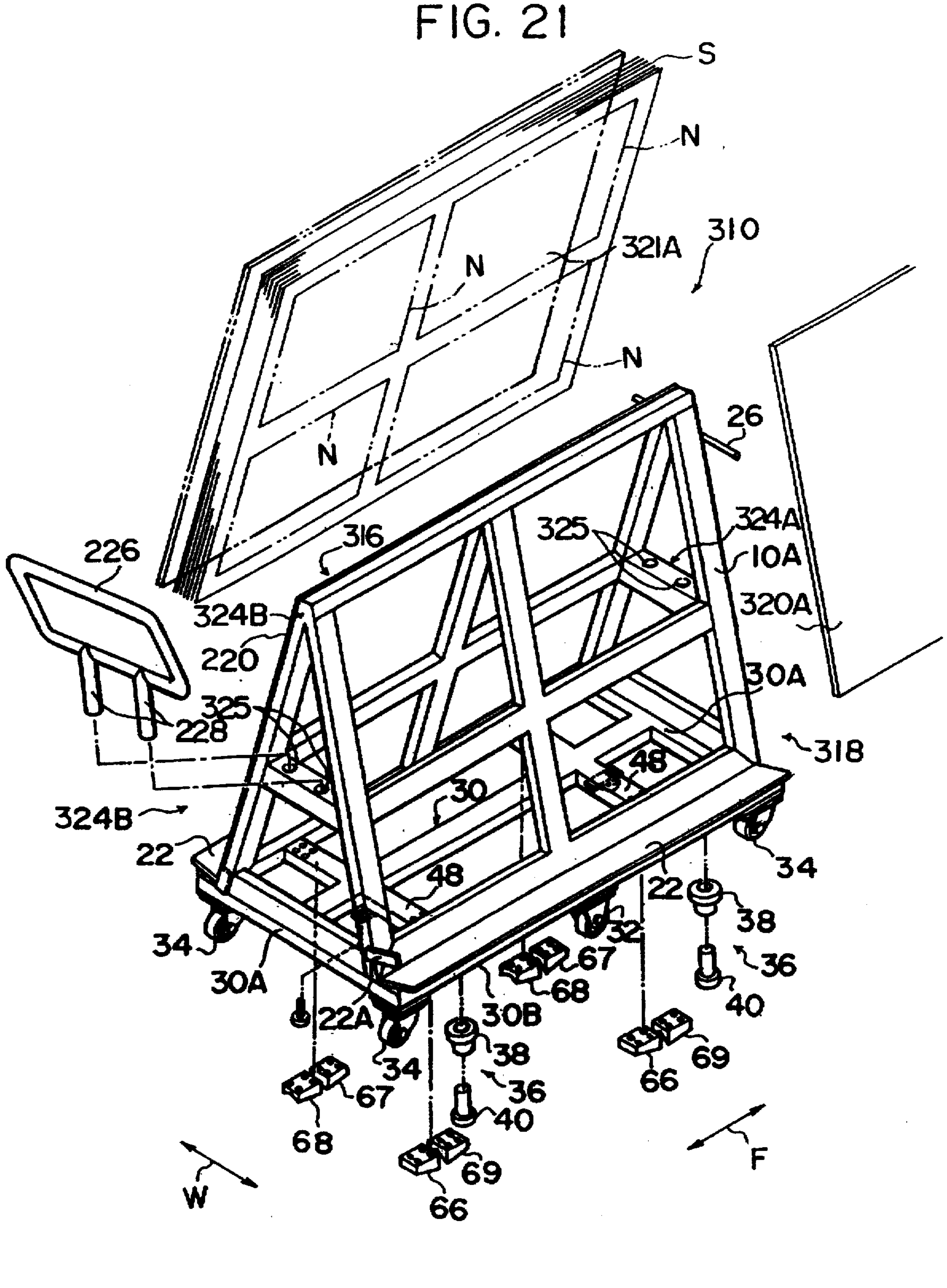
FIG. 21 is a exploded perspective view, similar to that of FIG. 18, of a fourth embodiment.

In FIG. 21, a printing plate stand 310 of a fourth embodiment is illustrated. Printing plates S that are the size of four newspaper pages can be loaded on this printing plate stand 310. Front wall 316 and rear wall 318 are wide. As viewed from a direction orthogonal to the directions in which the printing plate stand 310 approaches and moves away from the transfer apparatus 12, the printing plate stand 310 has a substantially isosceles triangular configuration. Through-holes 325 are formed in frames of end surfaces 324A, 324B, respectively. The legs 228 of the handle 226 are insertable into these through-holes 325.

Further, in FIG. 21, wear plates 321A and support plates 320A are sizes of four pages of newspaper. At the printing plate stand 310, the blocks 66, 68 and the blocks 67, 69 are the positioning means. Incidentally, in the drawings, reference letter N of the printing plates S refers to an area that is the size of one newspaper page.

The printing plate stand 310 can be moved by either pushing or pulling the handle 226 along with the printing plate stand 310. When the printing plate stand 310 is transported or stored, the handle 226 can be removed and set aside.

In this way, the handle 226 is used only in the moving of the printing plate stands 210, 310 and when the printing plates that are the size of four newspaper pages are being temporarily supplied to the printing plate stand 210. The handle 226 is usually removed and set aside. As a result, the handle 226 does not get in the way. A worker may carry the handle 226, attach it to the printing plate stand 210, and proceed with his work. After the printing plate stand 210 is stored, the handle 226 may be removed and stored in a predetermined place.

Namely, by having several handles 226, a number of the printing plate stands 210, 310 can be moved. There is no need to provide separate handles for each of the printing plate stands 210, 310.

The shape of the handle 226 is such that the handle 226 can be provided stably on the printing plate stands 210, 310. The top edge of the handle 226 may be at a predetermined height. Namely, the handle 226 may be disposed stably at the printing plate stand 210 and may be grasped at a predetermined height. Further, stoppers, such as projections, may be disposed at intermediate portions of the legs 228 such that the legs 228 may be inserted as far as a predetermined position and mounted thereat.

Figure 22:
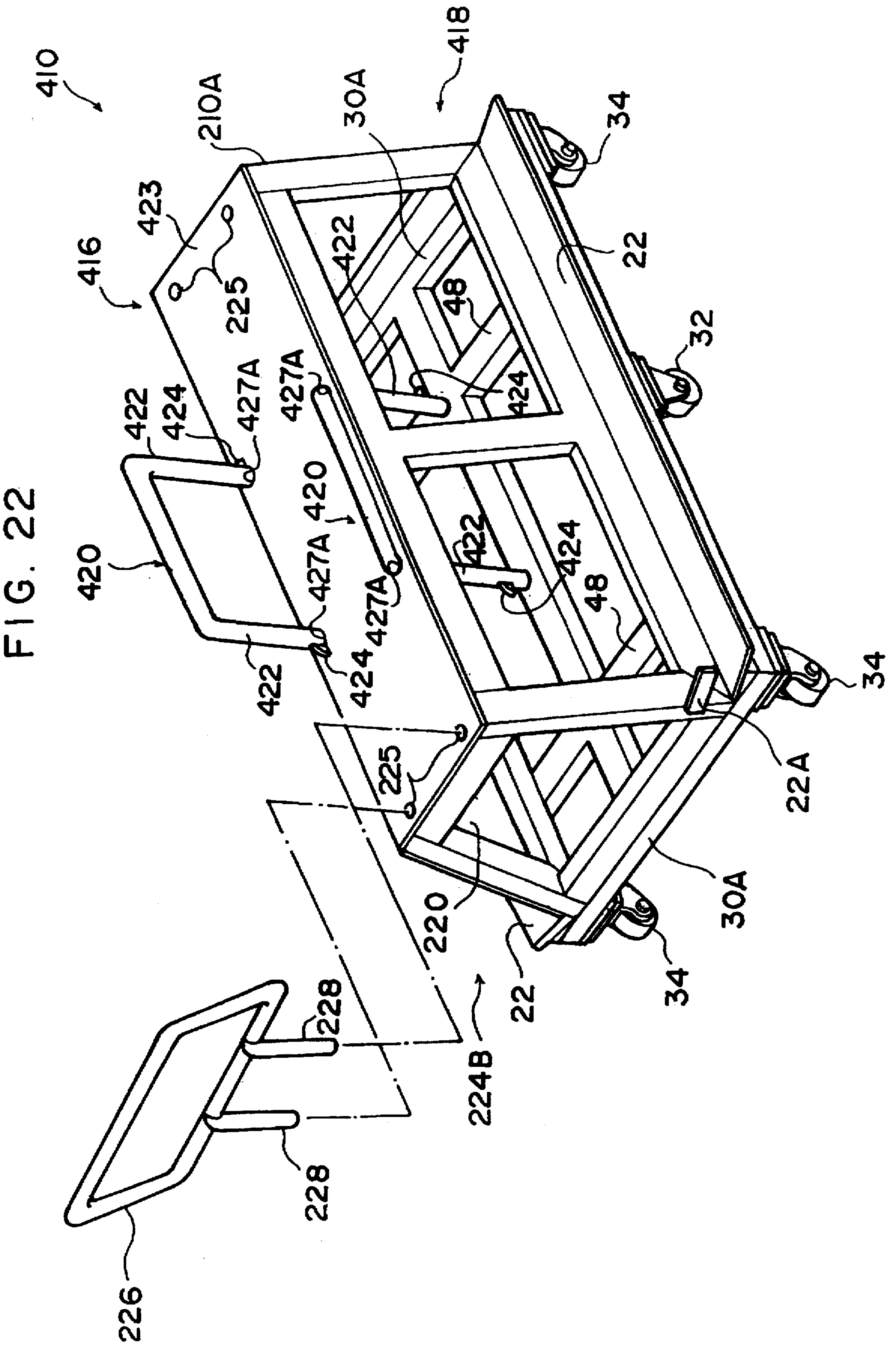
FIG. 22 is a schematic perspective view of a printing plate stand of a fifth embodiment.

In FIG. 22, a printing plate stand 410 of a fifth embodiment is illustrated.

A plurality of through-holes 427A is formed in a top plate 423 of the printing plate stand 410. These through-holes 427A are formed in respective vicinities of front wall 416 and rear wall 418. Legs 422 of a support bar 420, which is bent into a substantially U-shaped configuration, are inserted into the through-holes 427A. A stopper 424 is provided at an end portion of each of the legs 422 inserted into the through-holes 427A. The stopper 424 is urged by an unillustrated urging force from the interior of the leg 422 toward the outside. The stoppers 424 can be accommodated within the leg 422 against the urging force.

When the support bar 420 is pulled up, the stoppers 424 are pushed against inner surfaces of the through-holes 427A and are accommodated within the legs 422. When the pulled out support bar 420 is pushed down into the top plate 423, the stoppers 424, which are protruded out by the urging means, abut the top plate 423 at vicinities of the through-holes 427A.

At the printing plate stand 410, the printing plates S can be loaded by the protruding of the support bar 420 on either the front wall 416 side or the rear wall 418 side. Namely, vicinities of the top edges of the printing plates S abut against and are supported at an intermediate portion of the support bar 420.

The support bar 420 pushes the stoppers 424 and causes the stoppers 424 to be accommodated in the legs 422 while pushing the legs 422 into the through-holes 427A. Portions of the legs 422 of the support bar 420 are thereby accommodated inside the printing plate stand 410, i.e., the support bar 420 is in an accommodated state.

Further, the through-holes 427A are formed in the top plate 423 in respective vicinities of the front wall 416 and the rear wall 418. However, even if the through-holes 427A are formed in a substantially intermediate portion of the top plate 423 and the printing plates S are loaded on either of the front wall 416 or the rear wall 418 by the support bar 420, vicinities of the top edges of the printing plates S can be supported. Further, in the fifth embodiment, the support bar 420 is a printing plate supporting member. However, in the present invention, the support bar may be formed in any of various shapes and may protrude from the top of the printing plate stand 410 when necessary.

What is claimed is:

1. An apparatus for positioning a printing plate stand which is movable and on which a plurality of printing plates are loaded at both a first printing plate loading portion and a second printing plate loading portion, said printing plate stand being able to supply said printing plates to a printing plate transfer apparatus, said apparatus for positioning comprising:

raising and lowering means for moving said printing plate stand in vertical directions;

first positioning means for positioning said printing plate stand at a predetermined position, said first positioning means being provided so as to be located between said raising and lowering means and said printing plate stand when said printing plate stand is moved so that said first printing plate loading portion of said printing plate stand is opposed to and is adjacent said printing plate transfer apparatus, said first positioning means moving said printing plate stand along a first axis extending toward and away from said printing plate transfer apparatus and along a second axis orthogonal thereto so as to position said printing plate stand at a predetermined position;

second positioning means for positioning said printing plate at said predetermined position, said second positioning means being provided between said raising and lowering means and said printing plate stand when said printing plate stand is reversed so that said second printing plate loading portion of said printing plate stand is opposed to and is adjacent said printing plate transfer apparatus, said second positioning means moving said printing plate stand along said first and second axes so as to position said printing plate stand at said predetermined position; and third positioning means which stops said printing plate stand at said predetermined position so as to position said printing plate stand at said predetermined position, wherein each of said first and second positioning means includes: first positioning members each having a plurality of planar inclined surfaces and provided at one of a lower portion of a main body of said printing plate stand and said raising and lowering means; and second positioning members which are provided at the other of the lower portion of the main body of said printing plate stand and said raising and lowering means and abut said planar inclined surfaces of said first positioning members and slide said printing plate stand.

2. An apparatus for positioning a printing plate stand according to claim 1, wherein said first positioning members are block-shaped members, said planar inclined surfaces are triangular grooves formed in said block-shaped members, said second positioning members are rolling ball members which abut said triangular grooves, and said third positioning means is a member which stops said printing plate stand by abutting said printing plate stand.

3. The apparatus for positioning a printing plate stand according to claim 1, wherein said first and second positioning means position the printing plate stand in response to the weight of the printing plate stand.

4. An apparatus for positioning a printing plate stand at a predetermined position adjacent a transfer apparatus, comprising:

a drive mechanism for raising said printing plate stand off of the floor and for lowering said printing plate stand toward the floor;

first positioning members secured to said drive mechanism and second positioning members secured to said printing plate stand, said first and second positioning members being engageable with each other when said drive mechanism raises said printing plate stand off of the floor such that said printing plate stand is automatically urged in first and second orthogonally disposed, horizontal directions to said predetermined position in direct response to gravity acting on said printing plate stand, wherein one of said first and second positioning members includes inclined blocks having respective inclined surfaces and another of said first and second positioning members includes rollers which respectively engage said inclined surfaces.

5. The apparatus of claim 4, wherein four of said inclined blocks are provided, a first pair of said inclined blocks each including a pair of inclined surfaces which together define a v-shape to urge said printing plate stand in said first direction and a second pair of said inclined blocks each having an inclined surface to urge said printing plate stand in said second direction.

6. The apparatus of claim 5, wherein said inclined surfaces of said first pair of inclined blocks are sloped in a direction which is orthogonal to a direction in which said second pair of inclined blocks are sloped.

* * * * *